United States Patent
Bell et al.

(10) Patent No.: US 11,741,669 B2
(45) Date of Patent: *Aug. 29, 2023

(54) PROCESSING AND/OR TRANSMITTING 3D DATA ASSOCIATED WITH A 3D MODEL OF AN INTERIOR ENVIRONMENT

(71) Applicant: Matterport, Inc., Sunnyvale, CA (US)

(72) Inventors: Matthew Tschudy Bell, Palo Alto, CA (US); David Alan Gausebeck, Mountain View, CA (US); Gregory William Coombe, Mountain View, CA (US); Daniel Ford, Mountain View, CA (US)

(73) Assignee: Matterport, Inc., Sunnyvale, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 17/404,944

(22) Filed: Aug. 17, 2021

(65) Prior Publication Data
US 2021/0375047 A1 Dec. 2, 2021

Related U.S. Application Data

(63) Continuation of application No. 16/814,304, filed on Mar. 10, 2020, now Pat. No. 11,094,117, which is a
(Continued)

(51) Int. Cl.
*G06T 17/20* (2006.01)
*G06T 3/40* (2006.01)
*H04N 21/2362* (2011.01)

(52) U.S. Cl.
CPC ............. *G06T 17/20* (2013.01); *G06T 3/40* (2013.01); *G06T 2210/04* (2013.01);
(Continued)

(58) Field of Classification Search
CPC ....... G06T 17/20; G06T 3/40; G06T 2210/04; G06T 2210/08; G06T 2210/36; H04N 21/2362
See application file for complete search history.

(56) References Cited

U.S. PATENT DOCUMENTS 6,046,744 A 4/2000 Hoppe
6,931,531 B1 8/2005 Takahashi
(Continued)

FOREIGN PATENT DOCUMENTS

CN 102652308 A 8/2012
CN 103229041 A 7/2013

OTHER PUBLICATIONS

Sanchez, Victor, and Avideh Zakhor. "Planar 3D modeling of building interiors from point cloud data." 2012 19th IEEE International Conference on Image Processing. IEEE, 2012. (Year: 2012).*
(Continued)

*Primary Examiner* — Maurice L. Mcdowell, Jr.
(74) *Attorney, Agent, or Firm* — Ahmann Kloke LLP

(57) ABSTRACT

Systems and techniques for processing and/or transmitting three-dimensional (3D) data are presented. A partitioning component receives captured 3D data associated with a 3D model of an interior environment and partitions the captured 3D data into at least one data chunk associated with at least a first level of detail and a second level of detail. A data component stores 3D data including at least the first level of detail and the second level of detail for the at least one data chunk. An output component transmits a portion of data from the at least one data chunk that is associated with the first level of detail or the second level of detail to a remote client device based on information associated with the first level of detail and the second level of detail.

21 Claims, 11 Drawing Sheets

Related U.S. Application Data continuation of application No. 16/007,566, filed on Jun. 13, 2018, now Pat. No. 10,586,386, which is a continuation of application No. 15/187,611, filed on Jun. 20, 2016, now Pat. No. 10,026,224, which is a continuation of application No. 14/213,531, filed on Mar. 14, 2014, now Pat. No. 9,396,586.

(52) U.S. Cl.
CPC ...... *G06T 2210/08* (2013.01); *G06T 2210/36* (2013.01); *H04N 21/2362* (2013.01)

(56) References Cited

U.S. PATENT DOCUMENTS

| | | | |
|---|---|---|---|
| 8,471,849 | B1 | 6/2013 | Hickman et al. |
| 9,396,586 | B2 | 7/2016 | Bell et al. |
| 10,026,224 | B2 | 7/2018 | Bell et al. |
| 11,094,117 | B2 * | 8/2021 | Bell .................. G06T 3/40 |
| 2004/0203891 | A1 | 10/2004 | Cole et al. |
| 2005/0012742 | A1 | 1/2005 | Royan et al. |
| 2006/0061566 | A1 | 3/2006 | Verma et al. |
| 2008/0112610 | A1 | 5/2008 | Israelsen et al. |
| 2012/0188233 | A1 | 7/2012 | Shuster et al. |
| 2012/0188241 | A1 | 7/2012 | Ahn et al. |
| 2013/0156266 | A1 | 6/2013 | Horii |
| 2013/0321593 | A1 | 12/2013 | Kirk et al. |

OTHER PUBLICATIONS

Smith, Jason, G. Petrova, and Scott Schaefer. "Progressive encoding and compression of surfaces generated from point cloud data " Computers & Graphics 36.5 (2012): 341-348. (Year: 2012).*
Turner, Eric. "Watertight Floor Plans Generated from Laser Range Data." Electrical Engineering and Computer Sciences University of California at Berkeley (2013) . (Year: 2013).*
"Geometric primitive," Wikipedia, http://en.wikipedia.org/wiki/Geometric-primitive, Last accessed May 8, 2014, 2 pages.
"Primitive," Second Life Wiki, http://wiki.secondlife.com/wiki/Primitive, Last accessed May 8, 2014, 4 pages.
Björkman, M , et al., "Active 3D scene segmentation and detection of unknown objects," IEEE International Conference an Robotics and Automation, 2010, 7 pages.
Campbell, N., et al., "Automatic 3D Object Segmentation in Multiple Views using Volumetric Graph-Cuts," Image and Vision Computing, Jan. 2010, 10 pages.
Caselles, V., et al. "Minimal Surfaces Based Object Segmentation," IEEE Transactions on Pattern Analysis and Machine Intelligence, Apr. 1997, pp. 394-398, vol. 19, No. 4.
Cignoni, P., et al., "A comparison of mesh simplification algorithms," Sep. 25, 1997, 29 pages.
Communication pursuant to Article 94(3) EPC received for EP Patent Application Serial No. 15762454.5 dated Nov. 12, 2018, 6 pages.
Extended European Search Report received for EP Patent Application Serial No. 15762454.5 dated Oct. 10, 2017, 10 pages.
First Office Action received for Chinese Patent Application Serial No. 201580023254.8 dated Aug. 20, 2018, 32 pages.
Funkhouser, et al., Management of Large Amounts of Data in Interactive Building Walkthroughs, 1992, I3D '92 Proceedings of the 1992 symposium on Interactive 3D graphics pp. 11-20.
Haumont, D., et al., "Volumetric cell-and-portal generation," Eurographics, 2003, 10 pages, vol. 22, No. 3, Blackwell Publishers.
International Search Report and Written Opinion for International Patent Application Serial No. PCT/US2015/020439, dated Jun. 25, 2015 7 pages.
Lee, H., et al., "Angle-Analyzer: A Triangle-Quad Mesh Codec," EUROGRAPHICS, 2002, 10 pages, vol. 21, No. 3, Blackwell Publishers.
Merchán, P., et al., "3D Complex Scenes Segmentation from a Single Range Image Using Virtual Exploration," IBERAMIA, 2002, 10 pages.
Mulloni, et al., Interactive Walkthrough of Large 3D Models of Buildings on Mobile Devices, 2007, Proceedings of the twelfth international conference on 3D web technology, ser. Web3D '07. New York, NY, USA: ACM, 2007 pp. 17-25.
Non-Final Office Action for U.S. Appl. No. 14/213,531, dated Nov. 24, 2015, 45 pages.
Non-Final Office Action for U.S. Appl. No. 15/187,611 dated Oct. 5, 2017, 19 pages.
Notice of Allowance for U.S. Appl. No. 14/213,531 dated Mar. 18, 2016, 19 pages.
Notice of Allowance for U.S. Appl. No. 15/187,611 dated Mar. 14, 2018, 14 pages.
Pfister, H., et al., "Surfels: Surface Elements as Rendering Primitives," SIGGRAPH, 2000, pp. 335-342, New Orleans LA.
Roh, et al., An object-based 3D walk-through model for interior construction progress monitoring, 2011, Automation in Construction, 20 (1) pp. 66-75.
Second Office Action received for Chinese Patent Application Serial No. 201580023254.8 dated Apr. 11, 2019, 34 pages.
Teler, et al., "Streaming of Complex 3D Scenes for Remote Walkthroughs," 2001, Eurographics, vol. 20, No. 3, pp. 1-9.
Udayan et al., "Multi-level Information Representation Based LOD Streaming for Urban Navigation", 2013 International Symposium on UBIQUITOUSVIRTUAL Reality, IEEE, Jul. 10, 2013, pp. 30-33.
Udayan et al., "Semantic levels of 1-9 information hierarchy for urban street navigation", 2014 International Conference an Big Data and Smart Computing (BIGCOMP), IEEE, Jan. 15, 2014, pp. 235-240.
Yang, "A Progressive View-Dependent Technique for Interactive 3-D Mesh Transmission", IEEE Transactions on Circuits and Systems for Video Technology, vol. 14, No. 11, Nov. 2004 16 pages.

* cited by examiner

ND/OR TRANSMITTING 3D
DATA ASSOCIATED WITH A 3D MODEL OF
AN INTERIOR ENVIRONMENT

CROSS-REFERENCE TO RELATED APPLICATIONS

This application is a continuation of U.S. patent application Ser. No. 16/814,304 filed Mar. 10, 2020, entitled "PROCESSING AND/OR TRANSMITTING 3D DATA ASSOCIATED WITH A 3D MODEL OF AN INTERIOR ENVIRONMENT," which is a continuation of U.S. patent application Ser. No. 16/007,566 filed Jun. 13, 2018, entitled "PROCESSING AND/OR TRANSMITTING 3D DATA ASSOCIATED WITH A 3D MODEL OF AN INTERIOR ENVIRONMENT," now U.S. Pat. No. 10,586,386, which is a continuation of U.S. patent application Ser. No. 15/187,611 filed Jun. 20, 2016, entitled "PROCESSING AND/OR TRANSMITTING 3D DATA," now U.S. Pat. No. 10,026,224, which is a continuation of U.S. patent application Ser. No. 14/213,531 filed Mar. 14, 2014, entitled "PROCESSING AND/OR TRANSMITTING 3D DATA." now U.S. Pat. No. 9,396,586, all of which are hereby incorporated by reference herein.

TECHNICAL FIELD

This disclosure relates generally to three-dimensional (3D) modeling, and more specifically, to processing and/or transmitting 3D data.

BACKGROUND

Digital three-dimensional (3D) models can be generated based on scans of architectural spaces (e.g., houses, construction sites, office spaces, etc). Often times, 3D models generated based on scans of architectural spaces comprise large amounts of data (e.g., data points, polygons, textures, etc). As such, streaming 3D models to remote client devices (e.g., to display the 3D models on a remote client device) is often slow because of limited data bandwidth relative to the size of the 3D models. Moreover, once data for 3D models is delivered to a remote client device, rendering the 3D model or parts of the 3D model for display requires additional time. Furthermore, once data for 3D models is delivered to a remote client device, computing resources for rendering the 3D model or parts of the 3D model (e.g., texture memory, number of polygons that can be rendered at a certain frame rate, etc.) can be limited. As such, user experience is often hindered and/or computing resources are often constrained when employing current techniques for streaming 3D models to a remote client device. Accordingly, current techniques for streaming 3D models to a remote client device can be improved.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a partitioning component, a data component, and an output component. The partitioning component receives captured three-dimensional (3D) data associated with a 3D model of an interior environment and partitions the captured 3D data into at least one data chunk associated with at least a first level of detail and a second level of detail. The data component stores 3D data including at least the first level of detail and the second level of detail for the at least one data chunk. The output component transmits a portion of data from the at least one data chunk that is associated with the first level of detail or the second level of detail to a remote client device based on information associated with the first level of detail and the second level of detail. In an aspect, the partitioning component partitions the captured 3D data into the at least one data chunk based on identified architectural elements of the 3D model.

Additionally, a non-limiting implementation provides for receiving captured three-dimensional (3D) data associated with a 3D model of an indoor environment, partitioning the captured 3D data into at least one data segment associated with multiple levels of detail, storing 3D data including the multiple levels of detail associated with the at least one data segment in a data structure, and transmitting the multiple levels of detail for the at least one data segment to a remote device based on an order determined as a function of geometry data or texture data associated with the multiple levels of detail.

In accordance with another implementation, a system includes a server. The server partitions three-dimensional (3D) data associated with a 3D model of an interior environment into at least one data chunk associated with multiple levels of detail, stores the multiple levels of detail associated with the at least one data chunk in a data structure, and transmits the multiple levels of detail associated with the at least one data chunk to a remote device based on a transmission order determined as a function of data associated with the multiple levels of detail.

In accordance with yet another implementation, a system includes a partitioning component, a data component, and an output component. The partitioning component receives captured three-dimensional (3D) data associated with a 3D model of an interior environment and partitions the captured 3D data into a data chunk associated with a level of detail and a plurality of other data chunks associated with other levels of detail. The data component stores 3D data including at least the level of detail for the data chunk and the other levels of detail for the plurality of other data chunks. The output component initially transmits the data chunk to a remote device and subsequently transmits a portion of data from the plurality of other data chunks to the remote device based on information associated with the other levels of detail.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
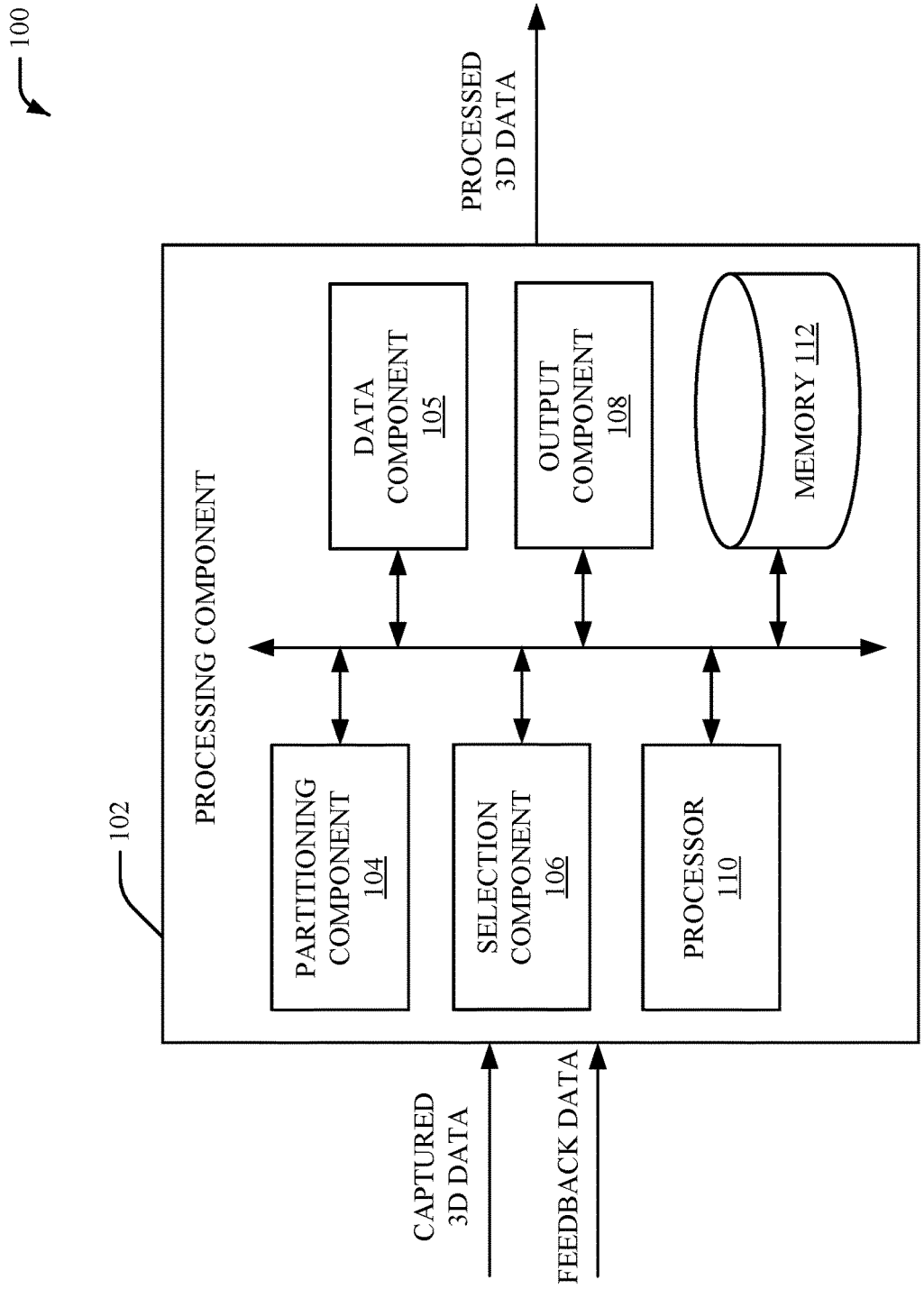
FIG. 1 illustrates a high-level block diagram of an example processing component for processing and/or transmitting three-dimensional (3D) data, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Digital three-dimensional (3D) models can be generated based on scans of architectural spaces (e.g., houses, construction sites, office spaces, etc). Oftentimes, 3D models generated based on scans of architectural spaces comprise large amounts of data (e.g., data points, polygons, textures, etc). As such, streaming 3D models to remote client devices (e.g., to display the 3D models on a remote client device) is often slow because of limited data bandwidth relative to the size of the 3D models. Moreover, once data for 3D models is delivered to a remote client device, rendering the 3D model or parts of the 3D model for display requires additional time. Furthermore, once data for 3D models is delivered to a remote client device, resources for rendering the 3D model or parts of the 3D model (e.g., texture memory, number of polygons that can be rendered at a certain frame rate, etc.) are limited. As such, user experience is often hindered and/or computing resources are often constrained when employing current techniques for streaming 3D models to a remote client device. Accordingly, current techniques for streaming 3D models to a remote client device can be improved.

To that end, techniques for processing and/or transmitting 3D data (e.g., 3D-reconstructed data) are presented. For example, the 3D data (e.g., the 3D-reconstructed data) can be generated based on a 3D reconstruction system that allows automatic and/or semi-automatic creation of 3D models of real-world locations (e.g., houses, apartments, construction sites, office spaces, commercial spaces, other living spaces, other working spaces, etc.). In one example, the 3D reconstruction system can employ 2D image data and/or depth data captured from 3D sensors (e.g., laser scanners, structured light systems, time-of-flight systems, etc.) to generate the 3D data (e.g., the 3D-reconstructed data). In an aspect, the 3D data (e.g., the 3D-reconstructed data) can be divided (e.g., automatically divided) into one or more data chunks. A data chunk can be a chunk of a 3D model or a particular region of a 3D model. The one or more data chunks can be determined based on architectural elements (e.g., walls, floors, rooms, objects, etc.) associated with the 3D data. For example, architectural elements associated with the 3D data can be identified (e.g., automatically identified), segmented (e.g., automatically segmented) and/or associated with data chunks. Each data chunk can be associated with one or more levels of detail. For example, each data chunk can be associated with one or more levels of detail for geometry and/or one or more levels of detail for texture (e.g., visual texture). In another aspect, an order for transmitting the one or more data chunks and/or the levels of detail associated with each data chunk can be determined (e.g., automatically determined). For example, an order for streaming the one or more data chunks and/or the levels of detail associated with each data chunk to a remote device (e.g., a remote client device) can be determined. As such, loading time for rendering 3D data (e.g., 3D models) that is streamed to a remote device can be improved. Furthermore, user experience when employing a remote client device to view 3D data (e.g., to view 3D models via a 3D model viewer) can be improved.

Referring initially to FIG. 1, there is illustrated a system 100 that can facilitate processing and/or transmitting 3D data (e.g., 3D-reconstructed data), according to an aspect of the subject disclosure. In one example, the system 100 can be implemented on or in connection with at least one server associated with 3D data (e.g., 3D-reconstructed data). The system 100 can be employed by various systems, such as, but not limited to 3D modeling systems, 3D reconstruction systems, server systems, cloud-based systems, and the like.

Specifically, the system 100 can provide a processing component 102 with a partitioning feature (e.g., partitioning component 104), a data feature (e.g., data component 105), a selection feature (e.g., selection component 106) and/or an output feature (e.g., output component 108) that can be utilized in, for example, a 3D modeling application (e.g., a 3D reconstruction application). The partitioning feature can receive captured 3D data associated with a 3D model of an interior environment. For example, a 3D model can comprise a 3D mesh (e.g., a triangle mesh, a quad mesh, a parametric mesh, etc.), a point cloud, surface elements (e.g., surfels) and/or other data captured by employing one or more 3D sensors. Furthermore, the partitioning feature can partition the captured 3D data into at least one data chunk associated with at least a first level of detail and a second level of detail. The data feature can store 3D data including at least the first level of detail and the second level of detail for the at least one data chunk. The output feature can transmit a portion of data from the at least one data chunk that is associated with the first level of detail or the second level of detail to a remote client device based on information (e.g., metadata) associated with the first level of detail and the second level of detail. The selection feature can select the portion of data from the at least one data chunk that is associated with the first level of detail or the second level of detail based on the information associated with the first level of detail and the second level of detail. In an embodiment, the system 100 can include the selection feature (e.g., the selection feature can be implemented on a server). In another embodiment, the selection feature can be implemented separate from the system 100 (e.g., the selection feature can be implemented on the remote client device).

In particular, the system 100 can include processing component 102. In FIG. 1, the processing component 102 includes a partitioning component 104, a data component 105, a selection component 106 and/or an output component 108. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The processing component 102 (e.g., with the partitioning component 104) can receive captured 3D data (e.g., CAPTURED 3D DATA shown in FIG. 1). The captured 3D data can be captured 3D-reconstructed data. In one example, the captured 3D data can be raw 3D-reconstructed data. In another example, the captured 3D data can be processed and/or segmented 3D-reconstructed data. In an aspect, the captured 3D data can be generated (e.g., captured) via at least one 3D reconstruction system. For example, the at least one 3D reconstruction system can employ two-dimensional (2D) image data and/or depth data captured from one or more 3D sensors (e.g., laser scanners, structured light systems, time-of-flight systems, etc.) to automatically and/or semi-automatically generate a 3D model of an interior environment (e.g., architectural spaces, architectural structures, physical objects, . . . ). In one embodiment, the one or more 3D sensors can be implemented on a camera to capture (e.g., simultaneously capture) texture data and geometric data associated with the interior environment. In another embodiment, the one or more 3D sensors can be implemented on a mobile device (e.g., a smartphone, etc.) to capture texture data and geometric data associated with the interior environment.

A 3D model of an interior environment (e.g., the captured 3D data) can comprise geometric data and/or texture data. The geometric data can comprise data points of geometry in addition to comprising texture coordinates associated with the data points of geometry (e.g., texture coordinates that indicate how to apply texture data to geometric data). For example, a 3D model of an interior environment (e.g., the captured 3D data) can comprise mesh data (e.g., a triangle mesh, a quad mesh, a parametric mesh, etc.), one or more texture-mapped meshes (e.g., one or more texture-mapped polygonal meshes, etc.), a point cloud, a set of point clouds, surfels and/or other data constructed by employing one or more 3D sensors. In one example, the captured 3D data can be configured in a triangle mesh format, a quad mesh format, a surfel format, a parameterized solid format, a geometric primitive format and/or another type of format. For example, each vertex of polygon in a texture-mapped mesh can include a UV coordinate for a point in a given texture (e.g., a 2D texture), where U and V are axes for the given texture. In a non-limiting example for a triangular mesh, each vertex of a triangle can include a UV coordinate for a point in a given texture. A triangle formed in the texture by three points of the triangle (e.g., a set of three UV coordinates) can be mapped onto a mesh triangle for rendering purposes. In an aspect, the captured 3D data can be unsegmented captured 3D data. For example, the captured 3D data can be 3D data that is not partitioned and/or processed after being captured by one or more 3D sensors (e.g., the at least one 3D reconstruction system).

An interior environment (e.g., an indoor environment) can include, but is not limited to, one or more rooms, one or more houses, one or more apartments, one or more office spaces, one or more construction sites, one or more commercial spaces, other living spaces, other working spaces, other environment spaces, interiors of buildings, vehicles, vessels, aircrafts, subways, tunnels, crawl spaces, equipment areas, attics, cavities, etc. Furthermore, an interior environment can include physical objects included in one or more rooms, one or more houses, one or more apartments, one or more office spaces, one or more construction sites, one or more commercial spaces, other living spaces, other working spaces and/or other environment spaces.

The partitioning component 104 can partition the captured 3D data. For example, the partitioning component 104 can divide the captured 3D data into one or more data chunks (e.g., one or more data partitions, one or more data segments, etc.). A data chunk can be a chunk of a 3D model or a particular region (e.g., subsection) of a 3D model. Each of the one or more data chunks can comprise one or more levels of detail for geometry and/or one or more levels of detail for texture (e.g., visual texture). In one example, each of the one or more data chunks can include multiple levels of detail for geometry and/or multiple levels of detail for texture. Therefore, a data chunk can include a hierarchical structure (e.g., a hierarchical structure associated with multiple levels of detail). In another example, the partitioning component 104 can generate a single data chunk for the 3D model. The single data chunk for the 3D model can be associated with a plurality of sub-chunks. Each of the plurality of sub-chunks can be a higher resolution than the single data chunk for the 3D model. In an aspect, the partitioning component 104 can partition the captured 3D data into at least one data chunk associated with at least a first level of detail and a second level of detail. The one or more data chunks and/or the levels of detail can provide greater flexibility when transmitting 3D data to a remote client device (e.g., when rending and/or loading a 3D model on a remote client device). In an aspect, the partitioning component 104 can assign an identifier (e.g., an identifier value, a tag, etc.) to each of the one or more data chunks (e.g., to identify and/or describe each data chunk).

The partitioning component 104 can identify (e.g., automatically identify) architectural elements associated with the captured 3D data (e.g., the 3D model). Architectural elements can include, but are not limited to, walls, floors, rooms, physical objects, etc. included in the 3D model. The partitioning component 104 can partition captured 3D data into at least one data chunk based on architectural elements (e.g., identified architectural elements) of a 3D model. For example, the one or more data chunks can correspond to one or more subsections (e.g., one or more architectural subsections, one or more architectural elements, etc.) of a 3D model (e.g., captured 3D data, etc.). In an aspect, a data chunk can comprise a flat structure, where each part of the 3D model (e.g., a triangle in a mesh, a region of space in the 3D model, a subsection of the 3D model, etc.) is associated with a single data chunk. For example, the partitioning component 104 can divide a 3D model of an architectural structure (e.g., a house, etc.) into 'rooms', where each 'room' is associated with a single data chunk. Therefore, the partitioning component 104 can associate at least one data chunk with a room included in a 3D model of an interior environment (e.g., a data chunk can be a data chunk of a room in a house).

In another aspect, each of the one or more data chunks can comprise a hierarchical data structure. For example, a data chunk can comprise a tree-like data structure associated with levels of detail. In yet another aspect, a particular data chunk can partially include, completely include, or replace other data chunks, e.g., in a tree-like data structure. In one example, one or more data chunks can be associated with a hierarchical data structure. In another example, an octree data structure can be implemented to hierarchically divide captured 3D data (e.g., a 3D model) into one or more data chunks (e.g., to form a tree data structure). For example, the partitioning component 104 can divide captured 3D data into one or more data chunks based on a tree data structure (e.g., an octree data structure). In an octree data structure, a particular data chunk, if not a leaf, can comprise up to eight children (e.g., eight associated data chunks, eight sub-chunks, etc.) which together can cover the same region of space in the particular data chunk. In one example, the eight children can correspond to eight blocks of data formed by subdividing a data chunk via planes aligned to three axes and centered on a center of a data chunk. In another example, multiple data chunks can share the same images of texture data. For example, one or more data chunks that are determined to be related based on a hierarchical data structure can be associated with the same texture data.

In an aspect, the selection component 106 can select a lowest resolution data chunk as an initial data chunk. In one example, a selected lowest resolution data chunk can comprise a different data structure than other data chunks. In another example, a selected lowest resolution data chunk can comprise a lowest mesh complexity and/or a lowest texture resolution. In yet another example, a selected lowest resolution data chunk can comprise flat images with associated position data. The selection component 106 can select a lowest-detail data chunk (e.g., a unique lowest-detail data chunk) that can be loaded on a remote client device as an initial data chunk for the 3D model.

In one embodiment, an initial data chunk can be a 3D model that comprises a certain number of flat planes (e.g., a minimal number of flat planes). One or more flat planes can correspond to each wall, each floor, and/or each ceiling in a 3D model. Furthermore, each flat plane can be textured by selecting a point of view in the middle of each room or near a wall. A scene from a perspective of the selected point of view can be projected onto the flat plane representing the wall, floor, or ceiling using data from a 3D model (e.g., a full-resolution 3D model). Accordingly, a 3D model can be processed with a lower polygon count and/or a minimal number of textures (e.g., polygon count and/or textures for a 3D model can be reduced). In an aspect, texture size can be further reduced by applying texture compression, selecting a single average color for each of the flat planes, or other techniques. In another aspect, flat planes can be expanded to overlap at edges and/or corners (e.g., to visually indicate a low resolution version of a 3D model, to allow a room to be viewed with fewer amounts of missing data prior to transmitting and/or loading 3D data associated with furniture, etc.).

In another embodiment, an initial data chunk can be a single texture which will be rendered on a ground plane for a 3D model. For example, an initial data chunk can correspond to a single mesh object (e.g., a single rectangular mesh object that is textured by a single rectangular texture). In an aspect, the texture for the single mesh object can be a birds-eye view of an architectural structure (e.g., house), or a birds-eye view of an interior space of an architectural structure (e.g., house). For example, a birds-eye view can be an orthographic projection of a 3D model onto a ground plane. In one example, back-face culling can be applied to the single mesh object so that a floor and/or other upwards facing surfaces (e.g., tabletops, counters, etc.) for a room in the architectural structure appear without also including a ceiling of the room in a projected image of a 3D model.

In an aspect, an initial chunk can be divided into a set of data chunks that together comprise a 3D model. For example, a data chunk can comprise physical boundaries that match or approximately match boundaries of a higher resolution data chunk or a set of higher resolution data chunks of the 3D model. Thus, as higher resolution data chunks are selected by the selection component 106 and/or transmitted by the output component 108, a data chunk can be removed from a display of a remote client device once all of the higher-resolution chunks corresponding to the same portion of the 3D model are also selected by the selection component 106 and/or transmitted by the output component 108.

It is to be appreciated that the partitioning component 104 can partition 3D data (e.g., generate one or more data chunks) in a variety of ways. It is also to be appreciated that the partitioning component 104 can combine and/or nest a particular partitioning technique with other partitioning techniques. Furthermore, it is to be appreciated that the partitioning component 104 can apply different partitioning techniques to different 3D models based on composition of a 3D model.

In an aspect, the partitioning component 104 can divide captured 3D data (e.g., a 3D model) into a number of regularly spaced data blocks with a fixed height and/or a fixed width. For example, data blocks can comprise (X,Y,Z) dimensions that correspond to width, length and height. Furthermore, the data blocks can be configured as space-filling patterns so that a center of a data block can comprise a coordinate of (a*width, b*length, c*height), where a, b and c are integers. Thus, X coordinates can be multiples of width, Y coordinates can be multiples of length, and Z coordinates can be multiples of height. Furthermore, each data block can correspond to a data chunk. Polygons (e.g., triangles, other geometry, etc.) that are included in (e.g., entirely within) a data block can be contained in a corresponding data chunk. Furthermore, polygons (e.g., triangles, other geometry, etc.) which are included in more than one data block can be assigned to a particular corresponding data chunk. In an aspect, a data chunk that does not include geometry can be discarded and/or designated as empty in a data tree structure. In another aspect, geometry that is included in more than one data block (e.g., which crosses from one data block to another data block) can be subdivided. For example, a triangle can be subdivided so that each component of the triangle is included (e.g., wholly included) within one data block. As such, sub-geometries can be assigned to data chunks corresponding to data blocks which fully contain the sub-geometry.

In another aspect, the partitioning component 104 can divide captured 3D data into one or more data chunks based on a Quad+Z tree data structure. For example, captured 3D data associated with a 3D model can comprise one or more floors of an architectural structure (e.g., a building, etc.). As such, a 3D model can be partitioned by employing a 2D grid in an X-Y plane (e.g., a horizontal plane). Therefore, volume encompassed by a data chunk can be a rectangular prism of infinite height, a rectangular prism corresponding to height of a single floor, etc. As such, an entire portion of a 3D model above and below a given square or rectangle in a horizontal plane can be included in a particular data chunk. In an aspect, a plane can be divided into 2D blocks. As such, geometry can be assigned to data chunks corresponding to each data block of the plane. Furthermore, the data blocks can be further subdivided in a hierarchical data structure.

The partitioning component 104 can divide captured 3D data into one or more data chunks based on subsections (e.g., rooms, cells, etc.) of the captured 3D data. For example, a subsection (e.g., a room, a cell, etc.) in a 3D model that is generated based on a scan of an interior space (e.g., by employing one or more 3D sensors) can be identified (e.g., automatically identified) and/or utilized (e.g., automatically utilized) as a data chunk for the 3D model. In an aspect, a subsection (e.g., a room, a cell, etc.) can be identified based on a cell and portal method (e.g., a volumetric cell and portal method, portal culling, etc.). For example, a volumetric representation of a 3D model can be employed to facilitate identifying subsections (e.g., rooms, cells, etc.) in the 3D model. Objects in the 3D model to separate can correspond to cells and separators in the 3D model can correspond to portals.

Figure 4:
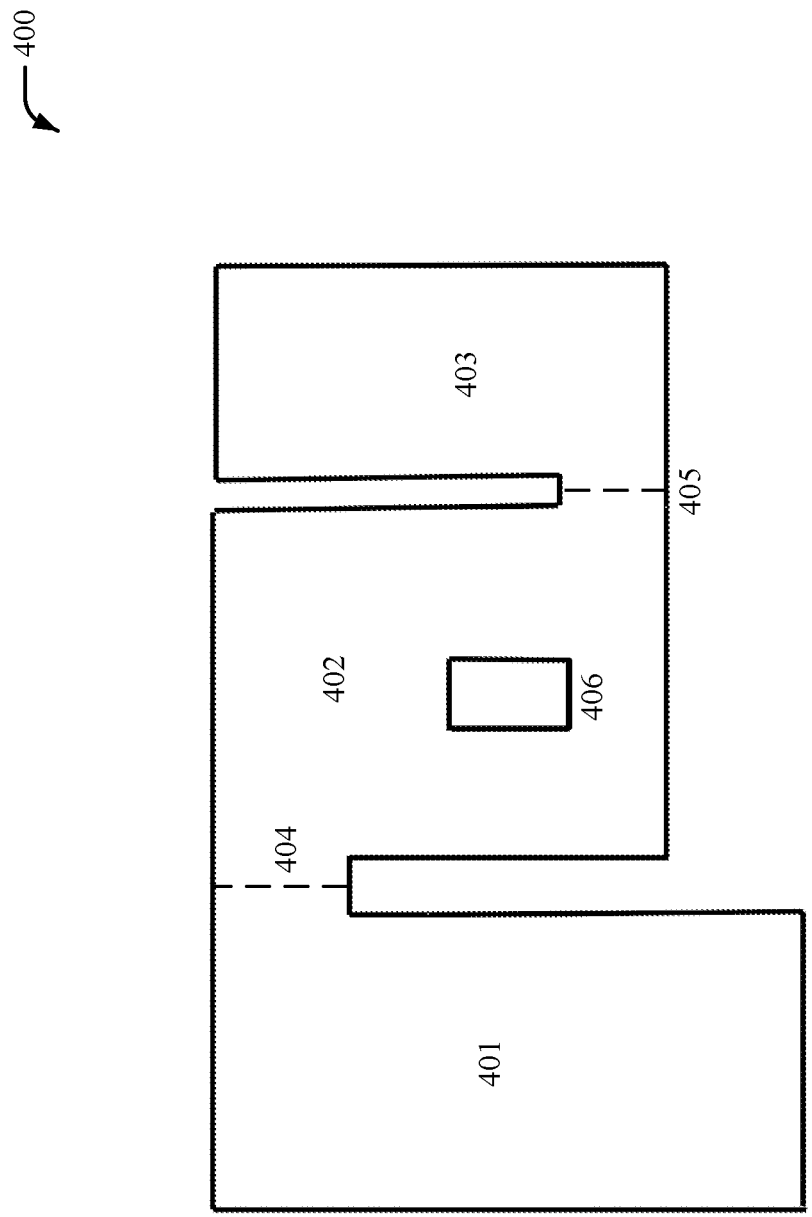
FIG. 4 illustrates a diagram of subsections associated with a 3D model, in accordance with various aspects and implementations described herein.

Once subsections (e.g., rooms, cells, etc.) are identified, the partitioning component 104 can divide a 3D model so that the set of geometry contained in or abutting each subsection corresponds to a data chunk. The partitioning component 104 can continue subdividing a 3D model until a particular threshold score (e.g., threshold value) for additional divisions is reached. Once the particular threshold score for the additional divisions is reached, each subdivided section can correspond to a unique data chunk. A non-limiting example of a decomposition process associated with a 3D model 400 in a top-down view is shown in FIG. 4. For example, 3D model 400 includes a subsection (e.g., a room, a cell, etc.) 401, a subsection (e.g., a room, a cell, etc.) 402, and a subsection (e.g., a room, a cell, etc.) 403. 3D model 400 also includes a portal (e.g., a division) 404 and a portal (e.g., a division) 405. For example, a portal can be a division between subsections (e.g., between rooms, between cells, etc.). In an aspect, the subsection 401, the subsection 402 and/or the subsection 403 can be further subdivided into data chunks and/or hierarchical sets of sub-data chunks based on one or more partitioning techniques. The 3D model 400 can correspond to partitioned (e.g., processed) 3D data.

Physical objects can be included within each subsection (e.g., within subsection 401, subsection 402 and/or subsection 403). For example, a physical object 406 can be identified (e.g., automatically identified) and/or separated (e.g., automatically separated) as a unique data chunk within the subsection 402. A physical object can include, but is not limited to, furniture, other mobile objects, etc. In an aspect, physical objects can be connected to (e.g., associated with) a particular subsection as a connected component. It is to be appreciated that the 3D model 400 can include more than one physical object. Additionally, the partitioning component 104 can identify walls and/or floors as prominent planes in the 3D model 400. After the partitioning component 104 identifies walls and/or floors as prominent planes in the 3D model 400 and/or associates the prominent planes (e.g., the identified walls and/or floors) as individual data chunks, the partitioning component 104 can remove the identified walls and/or floors from geometry (e.g., captured 3D data) yet to be assigned to a data chunk. Remaining connected components in the 3D model 400 can be physical objects (e.g., couches, tables, lamps desks, other furniture, etc.). As such, each connected component can be assigned to a unique data chunk. Additionally or alternatively, other techniques (e.g., graph-theory concept of minimum cut, etc.) can be applied to further subdivide remaining portions of the 3D model 400.

The partitioning component 104 can divide captured 3D data into one or more data chunks based on content type. For example, understanding and/or segmentation of captured 3D data (e.g., a 3D model) can be implemented as a basis for partitioning the captured 3D data (e.g., the 3D model). In one example, the partitioning component 104 can divide captured 3D data into one or more data chunks based on volumetric graph cuts, minimal surfaces, active 3D scene segmentation, virtual exploration of a 3D scene, etc. However, it is to be appreciated that the partitioning component 104 can divide captured 3D data into one or more data chunks based on a different technique. In an aspect, the partitioning component 104 can identify walls, floors and/or ceilings in captured 3D data by identifying planes within a mesh. For example, planes that comprise a particular size and/or a particular angle (e.g., an angle corresponding to walls, floors, or ceilings) can be identified as walls, floors and/or ceilings (e.g., a prominent plane). In one example, the partitioning component 104 can identify walls, floors and/or ceilings in captured 3D data based on an iterative method such as, for example, RANdom SAmple Consensus (RANSAC). For example, the partitioning component 104 can select a certain surface area and/or a certain number of edges, vertices, or triangles that are associated with a common plane. Furthermore, the partitioning component 104 can identify other points, vertices, or triangles that are also associated with the common plane. As such, the partitioning component 104 can determine that a common plane is a prominent plane (e.g., a wall, floor or ceiling) in response to a determination that a certain surface area or a certain number of edges, vertices, or triangles are associated with the common plane. Furthermore, the partitioning component 104 can remove geometry associated with the common plane. Moreover, the partitioning component 104 can repeat this process to identify other planes (e.g., other walls, floor or ceilings) in captured 3D data.

In one example, when the partitioning component 104 identifies and removes each plane from captured 3D data, connected components remaining in the captured 3D data can include physical objects, such as, but not limited to, tables, chairs, couches, desks, other furniture, etc. As such, the partitioning component 104 can assign each connected component (e.g., each physical object) of the captured 3D data to a unique data chunk. Additionally or alternatively, the partitioning component 104 can group connected components (e.g., physical objects) associated with captured 3D data. For example, connected components (e.g., physical objects) can be grouped by subsection (e.g., room). In another example, connected components (e.g., physical objects) can be grouped into a single "room content" data chunk. Each of the connected components (e.g., physical objects) included in the single "room content" data chunk can be associated with a set of sub-chunks (e.g., a data chunk hierarchy). For example, each sub-chunk in a set of sub-chunks can be associated with a different degree of resolution (e.g., a different level of detail). In an aspect, the partitioning component 104 can separate identified planes into data chunks with each connected component of each identified plane forming a unique data chunk. Additionally or alternatively, the partitioning component 104 can merge identified planes and/or connected components (e.g., physical objects) into a smaller number of data chunks. In another aspect, planes can be subdivided at subsection boundaries (e.g., room boundaries) or other locations in captured 3D data identified by employing subsection identification techniques (e.g., cell and portal methods, etc.).

In a non-limiting example as shown in FIG. 4, after identifying a separation between each subsection (e.g., each room), planes of the subsection 402 (e.g. walls and floors associated with a room) can be combined together into a single data chunk. Furthermore, remaining geometry within the volume of the subsection 402 can include a physical object 406 (e.g., a connected component such as, for example, a table). As such, the physical object 406 (e.g., geometry remaining in the captured 3D data) can form a single connected component. Furthermore, the physical object 406 can be assigned a unique data chunk.

In one example, one or more hole-filling techniques can be implemented to fill in missing data associated with captured 3D data. For example, geometry data and/or texture data for an occluded area can be missing when an area on a wall, floor, or other surface is occluded by an object. As such, one or more hole-filling techniques can be implemented to generate geometry data and/or texture data for an occluded area. In one example, a hole associated with a hole boundary that is within a certain distance from being planar can be filled geometrically by repeatedly connecting pairs of vertices that are two steps along the hole boundary to form triangles until the entire hole is triangulated. Visual data from the 3D reconstruction system can then be projected into two dimensions along an axis perpendicular to a determined plane (e.g., a best-fit plane) to the hole. Alternatively, texture data from an area around the hole can be blended according to a weighted average based on distance to provide visual data for the hole (e.g., missing data included in the hole). Alternatively, the texture of the area around the hole can be provided as input into a texture synthesis algorithm to fill in missing data associated with the hole.

In an aspect, the partitioning component 104 can divide captured 3D data into one or more data chunks based on subsections (e.g., rooms, cells, etc.) of the captured 3D data and content type. For example, the partitioning component 104 can divide a 3D model into one or more subsections (e.g., rooms). Furthermore, the partitioning component 104 can further divide each subsection (e.g., each room) into a set of architectural structures (e.g., walls, floors, ceilings, etc.) and into a set of physical objects (e.g., furniture, etc.) within each subsection (e.g., each room). In one example, the set of objects in each subsection can be associated with a single data chunk. In another example, the set of objects in each subsection can be subdivided into a plurality of data chunks. For example, each physical object in a subsection can comprise a unique data chunk. Furthermore, walls, floors, and/or ceilings of a subsection can comprise another data chunk. In one example, walls, floors, and/or ceilings can comprise a unique data chunk. In another example, walls, floors, and/or ceilings can be subdivided into a plurality of data chunks.

The data component 105 can store 3D data processed by the partitioning component 104. For example, the data component 105 can store segmented 3D data generated by the partitioning component 104. The data component 105 can be implemented as and/or associated with a data structure for storing one or more data chunks. In one example, the data component 105 can be a 3D data component. The data component 105 can store 3D data including levels of detail for each data chunk generated by the partitioning component 104. In an aspect, the data component 105 can store a hierarchy of data chunks. For example, the data component 105 can store multiple levels of detail for each data chunk.

The selection component 106 can select a data chunk and/or a level of detail for a data chunk from the data component 105. In an aspect, the selection component 106 can select a data chunk and/or a portion of data from at least one data chunk that is associated with at least a first level of detail and a second level of detail. For example, the selection component 106 can determine an order for sending the one or more data chunks and/or levels of detail associated with each data chunk (e.g., an order for the output component 108 to transmit the one or more data chunks and/or levels of detail associated with each data chunk to a remote client device). In an aspect, the selection component 106 can select a data chunk from a set of data chunks based on information (e.g., geometry data, texture data, level of detail data, resolution data, etc.) associated with each data chunk in the set of data chunks. In another aspect, the selection component 106 can select a portion of data from the at least one data chunk that is associated with the first level of detail or the second level of detail based on information (e.g., geometry data, texture data, number of sample data points, resolution data, mesh complexity, texture resolution, etc.) associated with the first level of detail and the second level of detail. The information associated with each data chunk in the set of data chunks can be metadata.

In one embodiment, the partitioning component 104 can receive captured three-dimensional (3D) data associated with a 3D model of an interior environment and partition the captured 3D data into a data chunk associated with a level of detail (e.g., a low resolution data chunk) and a plurality of other data chunks associated with other levels of detail (e.g., a plurality of higher resolution sub-chunks). The data component 105 can store 3D data including at least the level of detail for the data chunk and the other levels of detail for the plurality of other data chunks. The output component 108 can initially transmit the data chunk to a remote device and subsequently transmit a portion of data from the plurality of other data chunks to the remote device based on information associated with the other levels of detail. As such, a first data chunk selected by the selection component 106 can be a low resolution data chunk for the 3D model (e.g., a low resolution data chunk associated with the entire 3D model). After the selection component 106 selects the first data chunk, the selection component 106 can select one or more of the plurality of higher resolution sub-chunks for the 3D model. For example, each higher resolution sub-chunk for the 3D model can be associated with a subsection of the 3D model. One or more of the plurality of higher resolution sub-chunks for the 3D model can be superimposed onto the first data chunk (e.g., the low resolution data chunk for the 3D model). In an aspect, the partitioning component 104 can partition the captured 3D data into the plurality of other data chunks based on identified architectural elements of the 3D model. In another aspect, the data component 105 can store the other levels of detail for the plurality of data chunks at a greater level of detail (e.g., a higher resolution) than the level of detail for the data chunk.

In an aspect, the selection component 106 can employ an adaptive order to select and/or transmit the one or more data chunks and/or levels of detail. For example, the selection component 106 can select a data chunk from a set of data chunks and/or levels of detail associated with data chunk based on feedback data (e.g., FEEDBACK DATA shown in FIG. 1). Feedback data can include, but is not limited to position data associated with a rendering of the 3D model on the remote client device, orientation data associated with a rendering of the 3D model on the remote client device, etc. A 3D model viewer on the remote client device can display the rendering of the 3D model. The feedback data can be received from a remote client device (e.g., a remote client device that renders the 3D model, a remote client device that employs a 3D model viewer to display the 3D model, etc.). In one example, an adaptive order can be based on the position of a rendered view in a remote client device. In a non-limiting example where a data chunk is associated with a number of discrete detail levels, the selection component 106 can initially select and/or transmit each data chunk of the lowest detail in a certain fixed order or a certain variable order, then select and/or transmit each data chunk of the next most detailed level, etc. until a highest level data chunk is selected and/or transmitted.

The selection component 106 can select and/or transmit one or more data chunks and/or levels of detail based on position data associated with a rendered view on a remote client device (e.g., a remote client device configured for receiving the one or more data chunks and/or displaying a 3D model via a 3D model viewer). For example, the selection component 106 can select and/or transmit a particular data chunk that is closest to a camera position and/or a camera orientation (e.g., a point of view) associated with a rendering of the 3D model on a remote client device. In one example, the selection component 106 can select and/or transmit the particular data chunk from lowest level of detail to highest level of detail, then select and/or transmit a next closest data chunk from lowest level of detail to highest level of detail, etc. A closest data chunk can be a data chunk that contains a triangle, a surfel, or a point which is closest to a viewpoint associated with a remote client device (e.g., a viewpoint associated with a rendering of the 3D model on a remote client device). Alternatively, a closest data chunk can be a data chunk associated with a smallest average distance across all triangles, surfels, or points associated with the data chunk with respect to a viewpoint associated with a remote client device (e.g., a viewpoint associated with a rendering of the 3D model on a remote client device). In another aspect, the selection component 106 can select and/or transmit one or more data chunks and/or levels of detail based on a visibility-based culling technique. A visibility-based culling technique can include, but not limited to, view-frustum culling, occlusion culling, back-face culling, detail culling, etc. However, it is to be appreciated that the selection component 106 can implement similar techniques to select and/or transmit one or more data chunks and/or levels of detail.

The selection component 106 can select and/or transmit a portion of data associated with a level of detail based on a previously selected level of detail. In a non-limiting example, the selection component 106 can select and/or transmit a single chunk with two levels of detail associated with mesh data and/or texture data. For example, a 3D model can comprise a single chunk at multiple levels of detail. As such, the selection component 106 can initially select and/or transmit a low resolution version of the 3D model. For example, the low resolution version of the 3D model can comprise a mesh (e.g., a polygonal mesh) with a small number of triangles (e.g., 20 k) and low resolution textures (e.g. ⅛th of the pixel resolution in each dimension of a highest resolution texture, ⅛th of the pixel resolution in each dimension of 512×512 pixel images, etc.). In one example, textures can be encoded (e.g., JPEG encoded) with high compression to further reduce size. After the selection component 106 selects and/or transmits the low resolution version of the 3D model (e.g., a previously selected version of the 3D model), the selection component 106 can select and/or transmit a high resolution version of the 3D model and/or a full resolution version of the 3D model. A higher resolution version of the 3D model can correspond to greater mesh complexity and/or greater texture resolution. For example, a high resolution version of the 3D model can comprise a mesh (e.g., a polygonal mesh) with a large number of triangles (e.g., 500 k) and/or full resolution textures with little or no compression.

In another non-limiting example, the selection component 106 can select and/or transmit a single chunk with different texture levels of detail and/or different mesh levels of detail. For example, a 3D model can comprise a single chunk at multiple levels of detail. As such, the selection component 106 can initially select and/or transmit a low resolution version of the 3D model. For example, a low resolution version of the 3D model can comprise a mesh (e.g., a polygonal mesh) with a certain number of triangles (e.g., a small number of triangles as compared to other versions of the 3D model) and/or low resolution textures associated with a certain amount of compression (e.g., greater compression as compared to other versions of the 3D model). Next, the selection component 106 can select and/or transmit a high resolution version of the 3D model that comprises a mesh (e.g., a polygonal mesh) that employs the low resolution textures associated with the low resolution version of the 3D model. Next, the selection component 106 can select and/or transmit high resolution textures that can be mapped onto a high resolution mesh. For example, high resolution textures can comprise a highest resolution as compared to other versions of the 3D model (e.g., eight times as many pixels in each dimension as previously selected and/or transmitted textures, eight times as many pixels in each dimension as 2048×2048 pixel images, etc.). Furthermore, high resolution textures can comprise less compression as compared to other versions of the 3D model (e.g., high resolution textures can be encoded in a lossless format, etc.) for better final image quality. It is to be appreciated that these techniques can be extended to more than two levels of detail (e.g., to allow the selection component 106 to select and/or transmit progressively higher resolution meshes and/or textures). It is also to be appreciated that ordering employed by the selection component 106 to select and/or transmit level of detail for meshes and/or textures can be altered. For example, the selection component 106 can select and/or transmit high resolution textures prior to higher resolution meshes, etc. In an aspect, prioritization of textures-first or mesh-first can depend on a position from which a user is viewing the 3D model (e.g., a position of a remote client device). For example, textures may be prioritized if a user is viewing the 3D model via a 3D model viewer on a remote client device in greater detail (e.g., up close, zoomed in, etc.).

In an aspect, a higher-resolution version of a data chunk that is selected and/or transmitted by the selection component 106 can replace a lower resolution version of the data chunk in a list of 3D data to be displayed (e.g., displayed on a remote client device). In another aspect, a data chunk associated with a plurality of sub-chunks (e.g., a plurality of child data chunks with respect to a hierarchical data structure) can be replaced with one or more data chunks that are also associated with the plurality of sub-chunks (e.g., one or more data chunks associated with the plurality of child data chunks) in response to a determination that each of the plurality of sub-chunks are selected and/or transmitted by the selection component 106 (e.g., in response to a determination that each of the plurality of child sub-chunks have been transmitted to a remote client device). As such, a data chunk can be replaced in a display of a remote client device with higher-detail sub-chunks once all sub-chunks associated with the data chunk are loaded.

In one embodiment, the selection component 106 can select and/or transmit the one or more data chunks and/or levels of detail for the one or more data chunks based on a depth-first in resolution technique. For example, the selection component 106 can initially select and/or transmit a lowest resolution version of each data chunk in the 3D model. Then, the selection component 106 can select and/or transmit a next most detailed level for each data chunk, and so on until a highest level of detail for each data chunk has been selected and/or transmitted by the selection component 106. In an aspect, ordering within each detail level can be arbitrarily (e.g., randomly) determined. In one example, ordering within each detail level can be determined based on a random number generator.

In another embodiment, the selection component 106 can select and/or transmit the one or more data chunks and/or levels of detail for the one or more data chunks based on a highest resolution only technique. For example, the selection component 106 can select and/or transmit a highest level of detail version of each data chunk without selecting and/or transmitting any lower levels of detail for each data chunk. In an aspect, the selection component 106 can implement the high resolution only technique with other methods to select and/or transmit data chunks (e.g., the high resolution only technique can be combined with other methods to select data chunks and/or to determine an order for transmitting data chunks).

In yet another embodiment, the selection component 106 can select and/or transmit the one or more data chunks and/or levels of detail for the one or more data chunks based on a view frustum technique. For example, the selection component 106 can compute a view frustum based on position data and/or orientation data associated with a viewpoint of a remote client device (e.g., a remote client device configured for receiving the one or more data chunks and/or levels of detail for the one or more data chunks). The selection component 106 can determine (e.g., calculate) a list of data chunks that intersect the frustum based on the view frustum.

In an aspect, the selection component 106 can sort and/or order data chunks which intersect the frustum (e.g., data chunks which may be visible) based on distance with respect to the viewpoint of the remote client device. For example, the selection component 106 can select and/or transmit a closest data chunk in the view frustum which has not been selected and/or transmitted at a highest resolution. In one example, the selection component 106 can update and/or recalculate an ordering of data chunks which intersect the frustum when a view frustum changes. In an example, the selection component 106 can determine a closest data chunk and/or sort data chunks based on a search technique. For example, the selection component 106 can determine a closest data chunk and/or sort data chunks by employing an octree. In one example, the selection component 106 can determine data chunks that intersect particular portions (e.g., volumes) of an octree data structure. Data chunks can be stored in an octree data structure. As such, a portion (e.g., a volume) of a view frustum can be employed to query the octree data structure (e.g., to identify intersecting data chunks). Furthermore, the selection component 106 can analyze intersecting data chunks.

In another aspect, the selection component 106 can compute an angular size (e.g., an apparent angular size) of each data chunk within the frustum. For example, the selection component 106 can project a bounding region (e.g., a bounding cube of a data chunk intersected with the frustum) to the viewpoint associated with the remote client device. In one example, the selection component 106 can then order a list of data chunks intersecting the frustum based on the angular size. As such, a next data chunk selected and/or transmitted by the selection component 106 is a highest resolution version.

In yet another implementation, the selection component 106 can compute a score based on resolution of a data chunk and/or a computed angular size of the data chunk. For example, a score can be number of pixels or vertices per steradian (e.g., a measure of a solid angle) given a current level of detail of the data chunk and distance to the viewpoint associated with the remote client device. In another example, a score can be computed as a size of a data chunk (e.g., number of bytes of a data chunk) relative to steradian size of the data chunk from the viewpoint associated with the remote client device. In an aspect, the partitioning component 104 can select a level of detail for a data chunk with a lowest score so that a score for the data chunk is no longer a lowest score. The selected level of detail for the data chunk can be selected for transmission (e.g., the selected level of detail for the data chunk can be transmitted next to a remote client device). In another aspect, the selection component 106 can select a level of detail for a data chunk with the lowest score so that a new score for the data chunk is greater than a predetermined threshold value. The selected level of detail for the data chunk can be selected for transmission (e.g., the selected level of detail for the data chunk can be transmitted next to a remote client device). In one example, the selection component 106 can employ a different method to select and/or transmit a data chunk and/or a level of detail for a data chunk in response to a determination that all data chunks are greater than the predetermined threshold value. In another example, a different threshold value (e.g., a higher threshold value, a greater threshold value, etc.) can be implemented to select and/or transmit a data chunk and/or a level of detail for a data chunk in response to a determination that all data chunks are greater than the predetermined threshold value (e.g., in response to a determination that all data chunks satisfy the predetermined threshold value).

In yet another embodiment, the selection component 106 can select and/or transmit the one or more data chunks and/or levels of detail for the one or more data chunks based on information associated with a 3D model viewer (e.g., a 3D model viewer implemented on a remote client device). The selection component 106 can select and/or transmit one or more data chunks and/or levels of detail for one or more data chunks that occupy a greatest amount of space in a current view (e.g., a current rendered field of view) on a 3D model viewer. For example, the selection component 106 can initially select and/or transmit a lowest resolution version of each data chunk in the 3D model. Then, the selection component 106 can statistically sample and/or determine the number of camera rays emitted from a virtual camera (e.g., a virtual camera associated with a 3D model viewer implemented on a remote client device) within a current rendered field of view of the 3D model which intersect each data chunk of the 3D model (e.g., each data chunk of the 3D model as a first intersection with the 3D model). As such, the selection component 106 can select and/or transmit a next data chunk and/or a next level of detail for a data chunk based on the number of camera rays which intersect each data chunk. For example, a next data chunk and/or a next level of detail for a data chunk to be selected and/or transmitted can be a higher resolution version of the data chunk (e.g., a resolution version of the data chunk that is above a current resolution version of the data chunk being displayed on a remote client device) with a highest number of camera rays that is not loaded at the highest resolution. In response to a determination that each data chunk comprises more than two levels of resolution, the number of camera rays which have intersected a particular data chunk can be combined with a current level of detail of the particular data chunk to generate a score. For instance, the score can be employed to select and/or transmit a next data chunk and/or a next level of detail. In one example, the level of detail for a particular data chunk that is selected and/or transmitted can be one level of detail higher than a current level of detail for the particular data chunk. In another example, the level of detail for a particular data chunk that is selected and/or transmitted can be determined by a scoring function.

If each level of detail for a particular data chunk is twice as detailed in each direction as a previous level of detail for the data chunk, then a score can be determined based on number of camera rays that intersect with the particular data chunk and a level of detail of the particular data chunk. In one example, a score can correspond to RAYCOUNT/(4^LOD), where a variable RAYCOUNT is number of camera rays (e.g., number of camera rays that emit from a current user position on a rendering of the 3D model) that intersect with a particular data chunk on the 3D model and a variable LOD is a level of detail of the particular data chunk. For example, the variable RAYCOUNT can be a map from a data chunk identifiers (e.g., where each data chunk comprises a unique identifier) to integers. The variable RAYCOUNT can be initialized so that an identifier of each data chunk maps to an integer zero. The variable LOD can be a map from a data chunk identifiers to integers, where LOD[i] represents a current level of detail in a remote client device of a particular data chunk with identifier i, where identifier i is a non-negative integer. For example, a value of zero for identifier i can represent no detail in a remote client device for a particular data chunk, a value of one for identifier i can represents a first level of detail in the remote client device for the particular data chunk, etc. Each time a frame is rendered by the remote client device, the number of camera rays intersecting each data chunk as a first intersection with the 3D model can be calculated. The calculated number of camera rays for a current frame can be added to the integer mapped by an identifier for each data chunk. In one example, the map can be received by the selection component 106 from the remote client device. As such, the selection component 106 can determine a next data chunk to select and/or transmit.

Alternatively, the remote client device can request a next data chunk from the data component 105 based on sizes of detail and/or levels of detail of a data chunk currently employed by the remote client device. Additionally or alternatively, the remote client device can request a next data chunk from the data component 105 based on a list of data chunks and/or a list of detail levels. In an aspect, a score for a data chunk i is given by RAYCOUNT[i]/4^LOD[i]. For data chunks that are not associated with a highest level of detail, a next finest level of detail for a data chunk with a highest score can be selected and/or transmitted. In one example, the camera ray count (e.g., a count of camera rays intersecting each data chunk) can be replaced by a statistical sample in which a small number of randomly oriented camera rays within a field of view of a rendering of the 3D model on a remote client device are employed and/or nearest data chunk intersections of the randomly oriented camera rays are tallied. As such, the selection component 106 can select a data chunk and/or a level of detail based on a total number of camera rays employed to determine data associated with a data chunk. Alternatively, a buffer (e.g., a Z buffer) associated with a graphic component (e.g., a graphic card) on a remote client device can be utilized as an alternate to casting rays.

In yet another embodiment, the selection component 106 can select and/or transmit the one or more data chunks and/or levels of detail for the one or more data chunks based on user behavior when viewing a 3D model (e.g., past behavior of one or more users viewing a 3D model, user history, history of position data and/or orientation data, etc.) via a 3D model viewer on a remote client device. For example, previous positions of users (e.g., previous viewing positions of users) associated with a rendering of a 3D model can be employed to speculate future positions of users (e.g., likely future viewing positions of users). In an example, data chunks that are previously viewed the most (e.g., a most viewed data chunk) can be selected and/or transmitted by the selection component 106 first. For example, position data and/or orientation data associated with a camera view for viewing a 3D model via a 3D model viewer on a remote client device can be stored (e.g., at periodic intervals). The position data and/or orientation data can form a set of data points associated with a certain portion (e.g., a certain volume) of the 3D model. The set of data points can be processed (e.g., smoothed) to generate an average distribution of user locations over the certain portion (e.g., the certain volume) of the 3D model. As such, highest values of data points associated with the average distribution can be considered a most likely viewing position for a user. Furthermore, the highest values of data points associated with the average distribution (e.g., the most likely viewing position of the user) can be employed to determine initial data chunks and/or initial levels of detail to select and/or transmit. Alternatively, highest values of data points associated with the average distribution (e.g., the most likely viewing position of the user) can be employed to generate a model for predicting future user position and/or future user orientation based on current user position and/or current user orientation. In one example, the model for predicting future user position and/or future user orientation can be generated based on a hidden Markov model. However, it is to be appreciated that the model for predicting future user position and/or future user orientation can be generated based on a different technique. In an aspect, a probability distribution of near-future user positions and/or near-future user orientations (e.g., determined based on current user position and/or current user orientation) can be employed to select and/or transmit a next data chunk, prioritize data chunks that are likely to be near a user within a certain period of time, prioritize data chunks that are likely to be in a field of view for a 3D model viewer on a remote client device within a certain period of time, etc.

In an aspect, selection and/or transmission of physical objects can be de-prioritized in response to a determination that a 3D model is partitioned into architectural structures (e.g., walls, etc.) and/or physical objects contained within an architectural frame (e.g., furniture, etc.) unless the physical objects are included in the same subsection (e.g., the same room) as a current position of a user (e.g., a current position of a remote client device). In an non-limiting example, if a 3D model is partitioned into one data chunk for walls and floors of each subsection (e.g., each room), and one or more data chunks for physical objects of a subsection (e.g., content included in a subsection), then selection and/or transmission priority can be the following: initially select and/or transmit walls and floors of a subsection (e.g., a room) that a camera view of a 3D model viewer is currently associated with, followed by physical objects of the current subsection (e.g., content included in the current room), followed by walls and floors of adjacent subsections (e.g., adjacent rooms), followed by physical objects of adjacent subsections (e.g., content included in adjacent rooms), followed by all other walls and floors, followed by all other physical objects (e.g., all other content included in the 3D model). Data chunks can be selected and/or transmitted by the selection component 106 in priority order. In an aspect, ordering of the selection and/or transmission of data chunks can be updated periodically based on changes in a position of a camera view of a 3D model viewer. Additionally or alternatively, a priority ordering of data chunks at a particular level of detail can be determined for data chunks comprising multiple levels of detail.

It is to be appreciated that captured 3D data can be received by the selection component 106 and/or the output component 108 without being partitioned by the partitioning component 104. For example, captured 3D data can be transmitted to a remote client device without being partitioned into one or more data chunks and/or one or more levels of detail.

The output component 108 can transmit processed 3D data (e.g., PROCESSED 3D DATA shown in FIG. 1) to a remote client device. The remote client device can be configured to render and/or display a 3D model associated with the processed 3D data (e.g., via a 3D model viewer). For example, the output component 108 can transmit one or more data chunks and/or one or more levels of detail for data chunks based on an ordering (e.g., a transmission order) determined by the selection component 106. In one example, the processed 3D data can be processed 3D-reconstructed data.

In an aspect, the output component 108 can generate one or more visual effects for data chunks (e.g., high resolution data chunks) and/or levels of detail transmitted to a remote client device. In one example, the output component 108 can generate one or more visual effects for a high resolution data chunk (e.g., when transmitting a high resolution data chunk) after a flat data chunk or a low resolution data chunk is rendered by a remote client device (e.g., for display on a 3D model viewer). For example, a high resolution data chunk associated with a subsection of a 3D model (e.g., a room) can be rendered on the remote client device as rising out of a floor in the 3D model, as dropping from above the 3D model, as expanding from a particular point in the 3D model, as resembling an unstable state (e.g., blowing up and wobbling like jelly, etc.) before stabilizing in a final position in the 3D model, etc.

In another aspect, the output component 108 can generate a visual indication that a particular data chunk is not at a highest level of detail. For example, the output component 108 can generate an indication for a remote client device (e.g., a 3D model viewer implemented on a remote client device) that at least a portion of the 3D model is not at a highest available resolution. Furthermore, the output component 108 can generate an indication for a remote client device that a higher resolution version will be provided to the remote client device.

In one example, the output component 108 can generate a watermark for a low-resolution texture and/or append (e.g., superimpose) a watermark on textures associated with at least a portion of a data chunk that is not at a highest level of detail. In an example, a watermark can be applied in a regular pattern to textures which cover flat surfaces of a certain size. For example, walls and/or floors of a data chunk associated with a room can comprise watermarks, but physical objects (e.g., furniture) can be implemented without a watermark. In an aspect, a watermark can be animated with respect to time.

In another example, the output component 108 can configure a data chunk with a reduced alpha level so that other objects are visible through the data chunk. For example, a data chunk at a medium level of detail can comprise an alpha level of 70% (e.g., an alpha level where a data chunk is partially see-through, but mostly resembling a solid), while any data chunks at a highest level of detail comprise an alpha level of 100% (e.g., an alpha level where a data chunk is completely opaque).

In yet another example, the output component 108 can configure a data chunk to blink or smoothly interpolate over time in a cyclical fashion. For example, the output component 108 can configure a data chunk to alter between a full alpha level of 100% and an alpha level less than 100%. Additionally or alternatively, the output component 108 can configure color, brightness, hue, and/or saturation of a data chunk to alter in a cyclical fashion. In yet another example, the output component 108 can configure texture of a data chunk with different color, brightness, hue, and/or saturation. For example, the output component 108 can configure texture of a data chunk with lower levels of detail to be displayed as grayscale. In yet another example, the output component 108 can configure a data chunk with no texture (e.g., without texture). In yet another example, the output component 108 can configure a data chunk with a grid (e.g., a grid can be projected on a data chunk). In yet another example, the output component 108 can configure a data chunk (e.g., a data chunk to be displayed on a remote client device) with superimposed vertically or horizontally moving lines to suggest that a scanning operation for the data chunk is in progress. In yet another example, the output component 108 can generate a message (e.g., a loading message) in response to a determination that a portion of a 3D model is loading. Additionally or alternatively, the output component 108 can generate a message (e.g., a loading message) in response to a determination that a portion of the 3D model currently being displayed via a 3D model viewer on a remote client device is not at a highest possible level of detail.

In an aspect, the output component 108 can generate a projection of a portion of a 3D model (e.g., a 3D scene) where level of detail has not been provided for data chunks. In an example, the output component 108 can determine a point of projection to display an unloaded data chunk. For example, if a data chunk is a room, then a point of projection can be determined to be a point just outside a door to that room. In one example, projections can be displayed on flat planes located in the 3D model. For example, projections can be displayed at the portals (e.g., 404, 405) of unloaded subsections (e.g., 401, 402, 403). In another example, projections can be displayed as skyboxes within the 3D model.

While FIG. 1 depicts separate components in system 100, it is to be appreciated that the components may be implemented in a common component. In one example, the partitioning component 104, the data component 105, the selection component 106 and/or the output component 108 can be included in a single component. Further, it can be appreciated that the design of system 100 can include other component selections, component placements, etc., to facilitate processing and/or transmitting 3D data.

Figure 2:
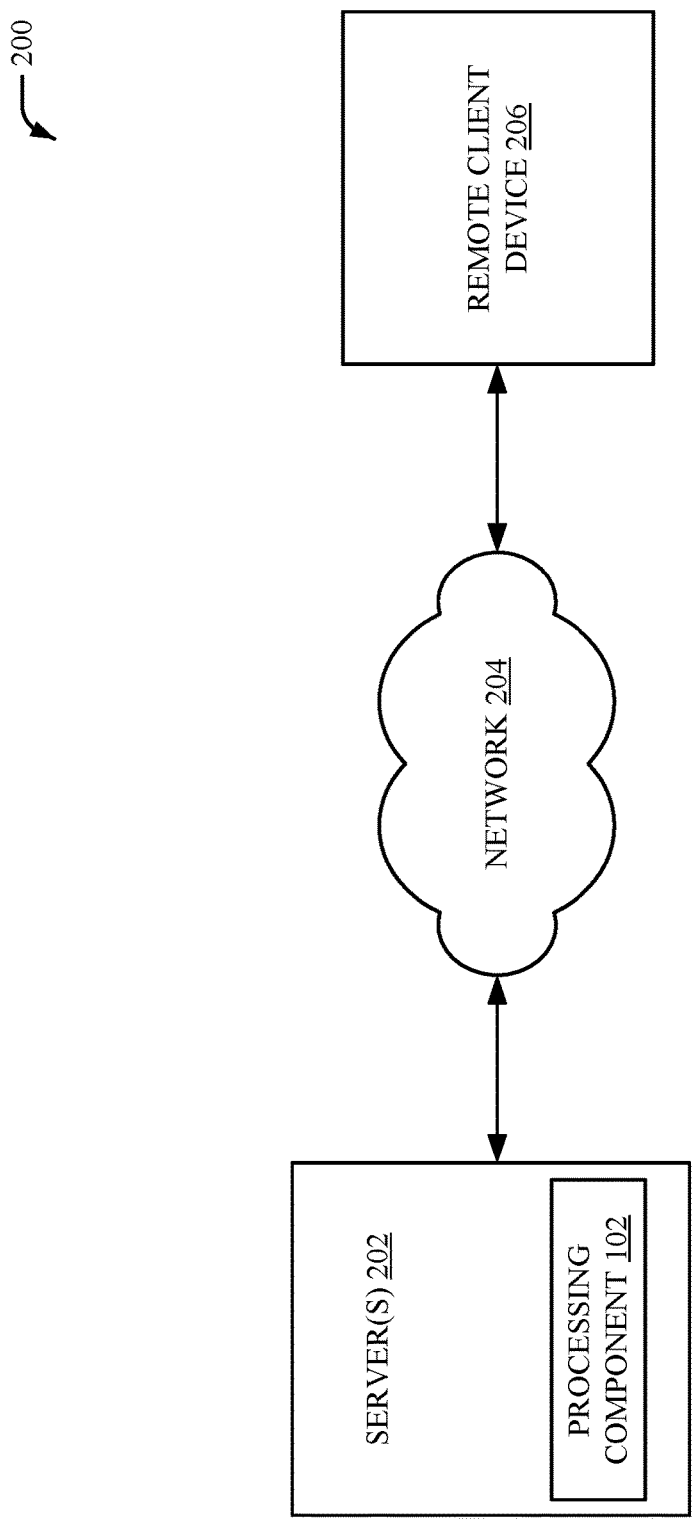
FIG. 2 illustrates a high-level block diagram of a system for processing and/or transmitting 3D data, in accordance with various aspects and implementations described herein.

Referring to FIG. 2, there is illustrated a non-limiting implementation of a system 200 in accordance with various aspects and implementations of this disclosure. The system includes at least one server 202, a network 204 and a remote client device 206. The at least one server 202 can include at least the processing component 102. The processing component 102 can include the partitioning component 104, the data component 105, the selection component 106 and/or the output component 108.

The remote client device 206 can be configured to receive 3D data (e.g., processed 3D data, processed 3D-reconstructed data, etc.) to render and/or display a 3D model. A 3D model can be displayed on the remote client device 206 via a 3D model viewer. Additionally, the remote client device 206 can determine position data and/or orientation data (e.g., feedback data) associated with a viewpoint and/or a camera position of a rendering of a 3D model on the 3D model viewer. The remote client device 206 can transmit the position data and/or orientation data (e.g., feedback data) to the at least one server 202. In an aspect, the at least one server 202 can be associated with a 3D reconstruction system. In another aspect, the remote client device 206 can be associated with a user (e.g., a user identity, etc.). The remote client device 206 can include, but is not limited to, a cellular phone (e.g., a smart phone), a tablet, a personal computer (PC), a desktop computer, a laptop computer, a camera, a 3D capture system, another portable computing device, etc. The at least one server 202 can be communicably coupled to the remote client device 206 via the network 204. The network 204 can include one or more networks. For example, network 204 can include one or more wireless networks and/or one or more wired networks, including but not limited to, a cellular network, a wide area network (WAN, e.g., the Internet), a local area network (LAN) and/or a personal area network (PAN). In an example, the at least one server 202 (e.g., the processing component 102) can transmit processed 3D data to the remote client device 206 via the network 204. As such, the remote client device 206 can receive processed 3D data via virtually any desired wireless or wired technology, including, for example, cellular, WAN, wireless fidelity, etc.

The at least one server 202 (e.g., the processing component 102) can process and/or transmit 3D data, as more fully disclosed herein. For example, in an aspect, the at least one server 202 (e.g., the processing component 102) can partition 3D data associated with a 3D model into at least one data chunk associated with multiple levels of detail. Furthermore, the at least one server 202 (e.g., the processing component 102) can determine a transmission order for the multiple levels of detail associated with the at least one data chunk based on data associated with the multiple levels of detail. In an aspect, the at least one server 202 (e.g., the processing component 102) can further determine the transmission order for the multiple levels of detail associated with the at least one data chunk based on feedback data (e.g., position data and/or orientation data) and/or a transmission order of data chunks associated with the remote client device 206. In one example, the data associated with the multiple levels of detail can comprise geometric data and/or texture data. In another aspect, the at least one server 202 can transmit information associated with data chunks and/or levels of detail (e.g., size information of data chunks, hierarchy information for data chunks, etc.) to the remote client device 206.

The remote client device 206 can receive the multiple levels of detail associated with the at least one data chunk and/or multiple data chunks from the at least one server 202 (e.g., the processing component 102) based on the transmission order. In an aspect, the remote client device 206 can receive the multiple levels of detail from lowest level of detail to highest level of detail. Furthermore, the remote client device 206 can render at least a portion of the 3D model based on the multiple levels of detail associated with the at least one data chunk.

In an example, the at least one server 202 (e.g., the processing component 102) can receive and/or store captured 3D data associated with a 3D model. The at least one server 202 can partition the captured 3D data into one or more data chunks (e.g., based on identified architectural elements of the 3D model). Furthermore, the remote client device 206 can receive data chunks generated by the at least one server 202 and/or render the data chunks received from the at least one server 202. A user can view a rendered 3D model via a 3D model viewer on the remote client device 206 once the remote client device 206 receives enough data chunks to construct the rendered 3D model on the 3D model viewer. As a camera view associated with the rendered 3D model on the 3D model viewer varies, the at least one server 202 can transmit new data chunks to the remote client device 206. In an aspect, the at least one server 202 can transmit new data chunks to the remote client device 206 based on position data and/or orientation data associated with the camera view (e.g., the camera view associated with the rendered 3D model on the 3D model viewer). It is to be appreciated that the at least one server 202 (e.g., the processing component 102) and/or the remote client device 206 can include other features and/or be associated with other techniques for processing and/or transmitting 3D data, as more fully disclosed herein.

Figure 3:
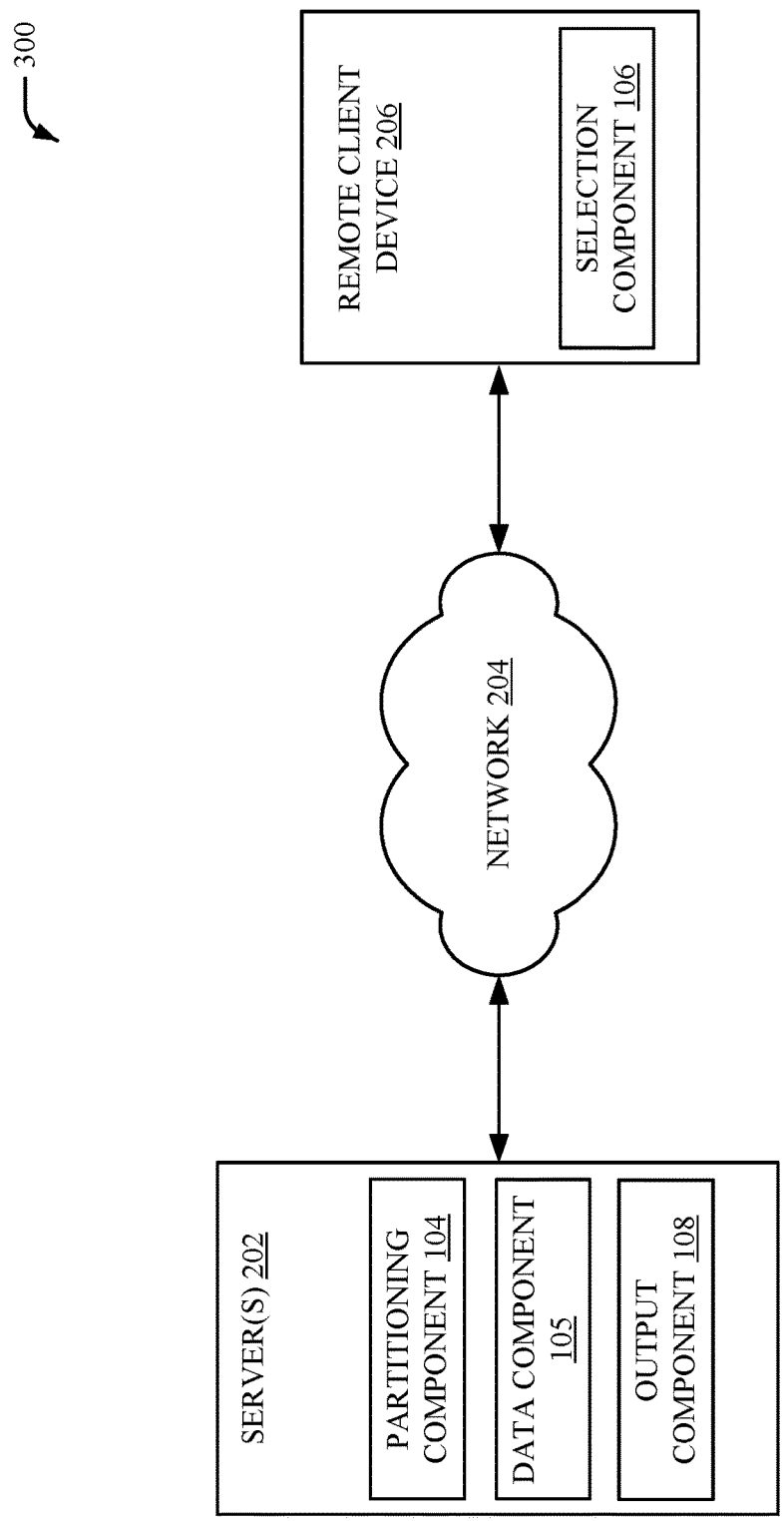
FIG. 3 illustrates a high-level block diagram of another system for processing and/or transmitting 3D data, in accordance with various aspects and implementations described herein.

Referring to FIG. 3, there is illustrated a non-limiting implementation of a system 300 in accordance with various aspects and implementations of this disclosure. The system includes the at least one server 202, the network 204 and the remote client device 206. The at least one server 202 can include at least the partitioning component 104, the data component 105 and/or the output component 108. The remote client device 206 can include at least the selection component 106.

The partitioning component 104, the data component 105 and/or the output component 108 implemented on the at least one server 202 can process and/or transmit 3D data, as more fully disclosed herein. In an aspect, the at least one server 202 can partition 3D data associated with a 3D model of an interior environment into at least one data chunk associated with multiple levels of detail, store the multiple levels of detail associated with the at least one data chunk in a data structure, and/or transmit the multiple levels of detail associated with the at least one data chunk to a remote device based on a transmission order determined as a function of data associated with the multiple levels of detail.

The remote client device 206 can determine the transmission order for the multiple levels of detail associated with the at least one data chunk based on the data associated with the levels of detail, receive the multiple levels of detail associated with the at least one data chunk from the server based on the transmission order, and/or render at least a portion of the 3D model based on the multiple levels of detail associated with the at least one data chunk. In an aspect, the remote client device 206 can request a particular data chunk and/or a particular level of detail for a data chunk stored in the data component 105 (e.g., send a request to the at least one server 202 that includes information regarding a particular data chunk and/or a particular level of detail for a data chunk) based on the determined transmission order. The remote client device 206 can load requested data chunks and/or requested levels of detail via a 3D model viewer associated with the remote client device 206.

The at least one server 202 can transmit information associated with data chunks and/or the levels of detail to the remote client device 206 (e.g., the selection component 106 implemented on the remote client device 206) to facilitate selection of a data chunk and/or a level of detail associated with a data chunk. The information can include, but is not limited to size information for the data chunks, position information for data chunks, level of detail information for data chunks, etc. In one example, the at least one server 202 can transmit a hierarchy index associated with the data component 105 to the remote client device 206. A hierarchy index can be an index of data chunks and/or levels of detail stored in the data component 105. As such, the remote client device 206 can determine a transmission order based on the information and/or the hierarchy index received from the at least one server 202. It is to be appreciated that the selection component 106 implemented on the remote client device 206 can additionally or alternatively implement other features and/or be associated with other techniques for selecting a data chunk and/or a level of detail associated with a data chunk, as more fully disclosed herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 5:
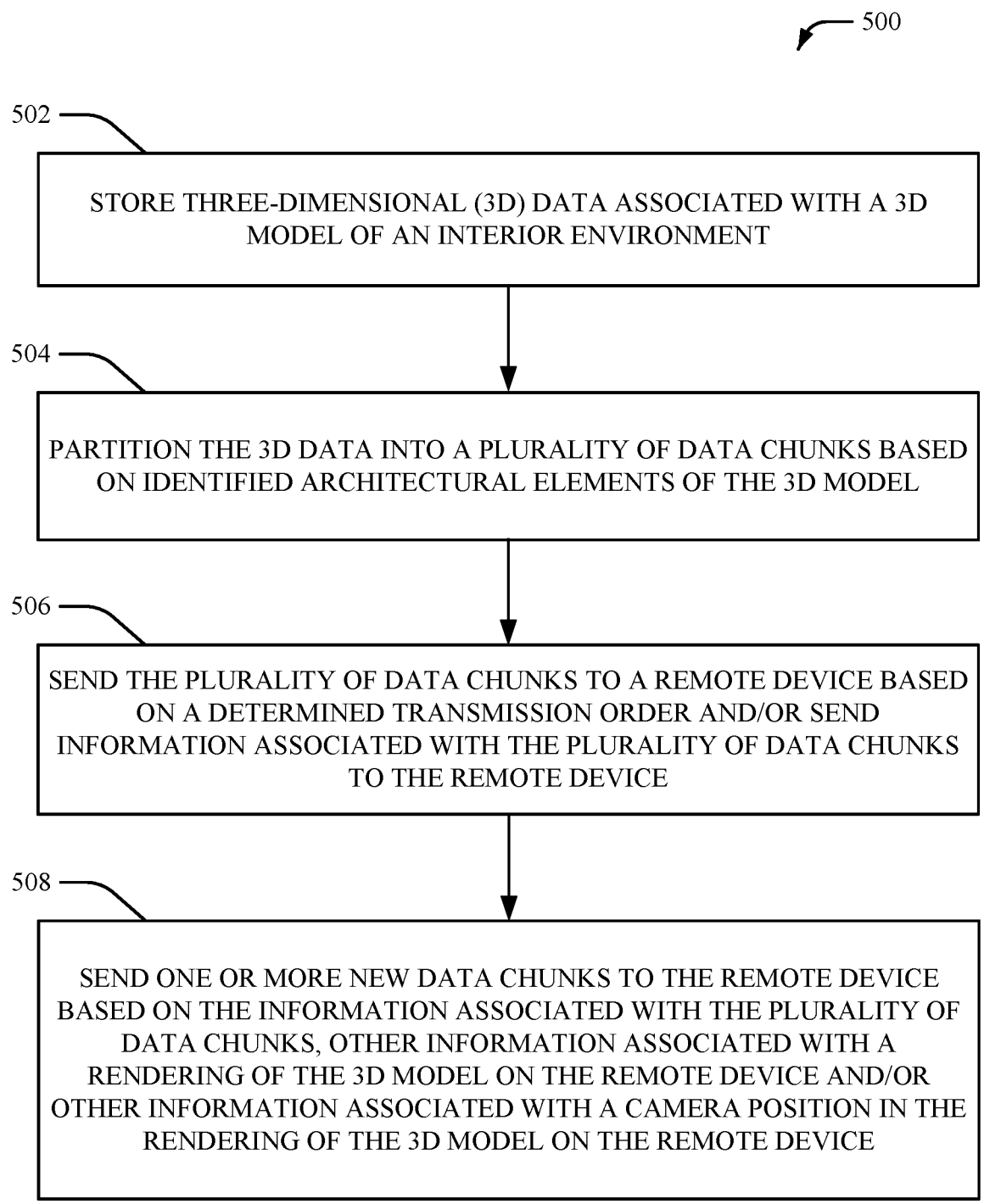
FIG. 5 depicts a flow diagram of an example method for processing and/or transmitting 3D data, in accordance with various aspects and implementations described herein.

Referring to FIG. 5, there illustrated is a methodology 500 for processing and/or transmitting 3D data, according to an aspect of the subject innovation. As an example, methodology 500 can be utilized in various applications, such as, but not limited to, 3D modeling systems, 3D reconstruction systems, server systems, cloud-based systems, etc. At 502, three-dimensional (3D) data associated with a 3D model of an interior environment is stored (e.g., by at least one server 202). At 504, the 3D data is partitioned into at least one data chunk (e.g., by at least one server 202) based on identified architectural elements of the 3D model. At 506, the plurality of data chunks are sent to a remote device (e.g., by at least one server 202) based on a determined transmission order. Additionally or alternatively, information associated with the plurality of data chunks are sent to the remote device (e.g., by at least one server 202). For example, information associated with the plurality of data chunks can include, but is not limited to, size information for the plurality of data chunks, position information for the plurality of data chunks, hierarchy information (e.g., level of detail information) for the plurality of data chunks, etc. At 508, one or more new data chunks are sent to the remote device (e.g., by at least one server 202) based on the information associated with the plurality of data chunks, other information associated with a rendering of the 3D model on the remote device and/or other information associated with a camera position in the rendering of the 3D model on the remote device.

Figure 6:
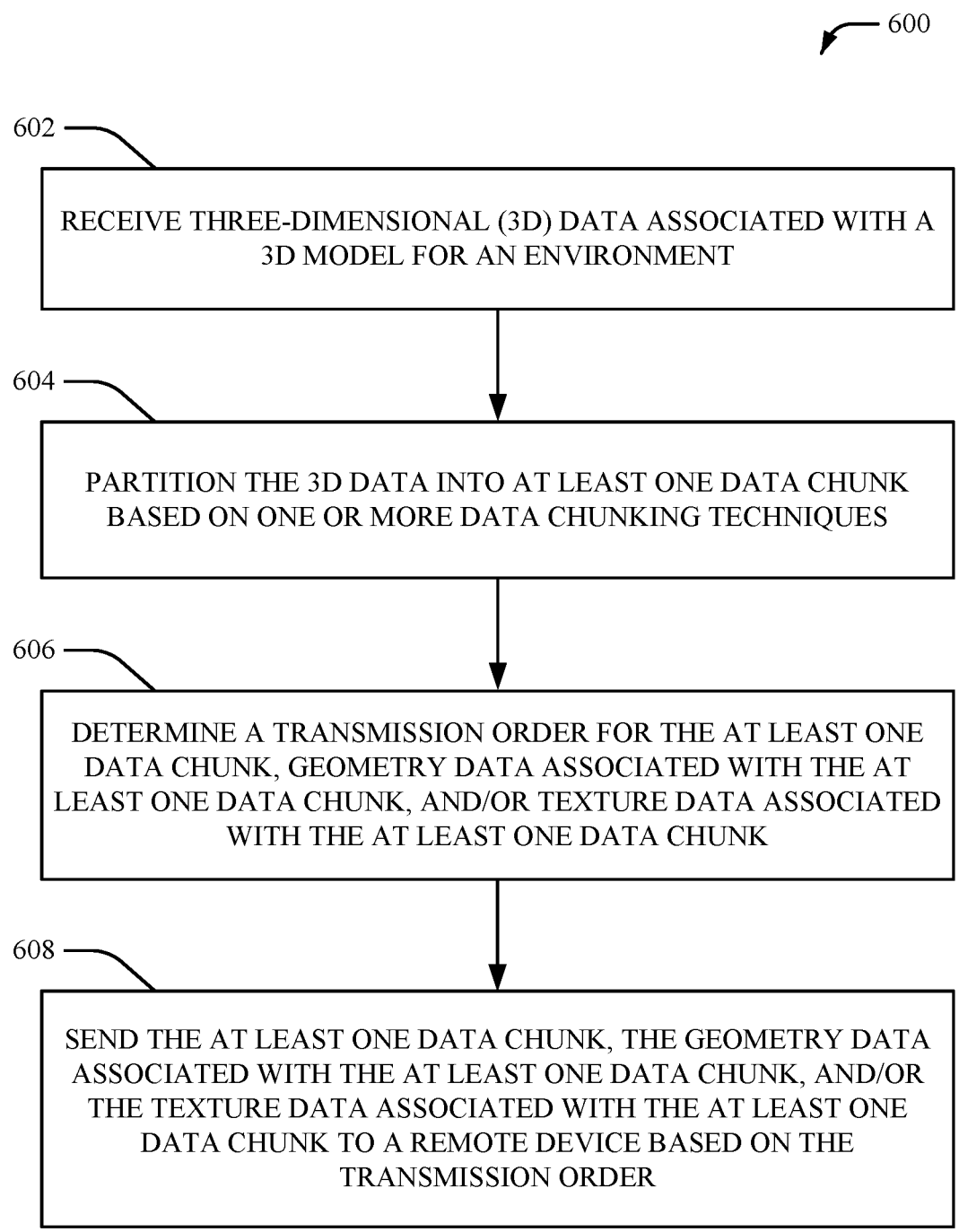
FIG. 6 depicts a flow diagram of another example method for processing and/or transmitting 3D data, in accordance with various aspects and implementations described herein.

Referring to FIG. 6, there illustrated is a methodology 600 for processing and/or transmitting 3D data, according to another aspect of the subject innovation. At 602, three-dimensional (3D) data associated with a 3D model for an environment is received (e.g., by a processing component 102 and/or a partitioning component 104). At 604, the 3D data is partitioned into at least one data chunk (e.g., by a partitioning component 104) based on one or more data chunking techniques. At 606, a transmission order for the at least one data chunk, geometry data associated with the at least one data chunk, and/or texture data associated with the at least one data chunk is determined (e.g., by a selection component 106). At 608, the at least one data chunk, the geometry data associated with the at least one data chunk, and/or the texture data associated with the at least one data chunk is sent to a remote device (e.g., by an output component 108) based on the transmission order.

Figure 7:
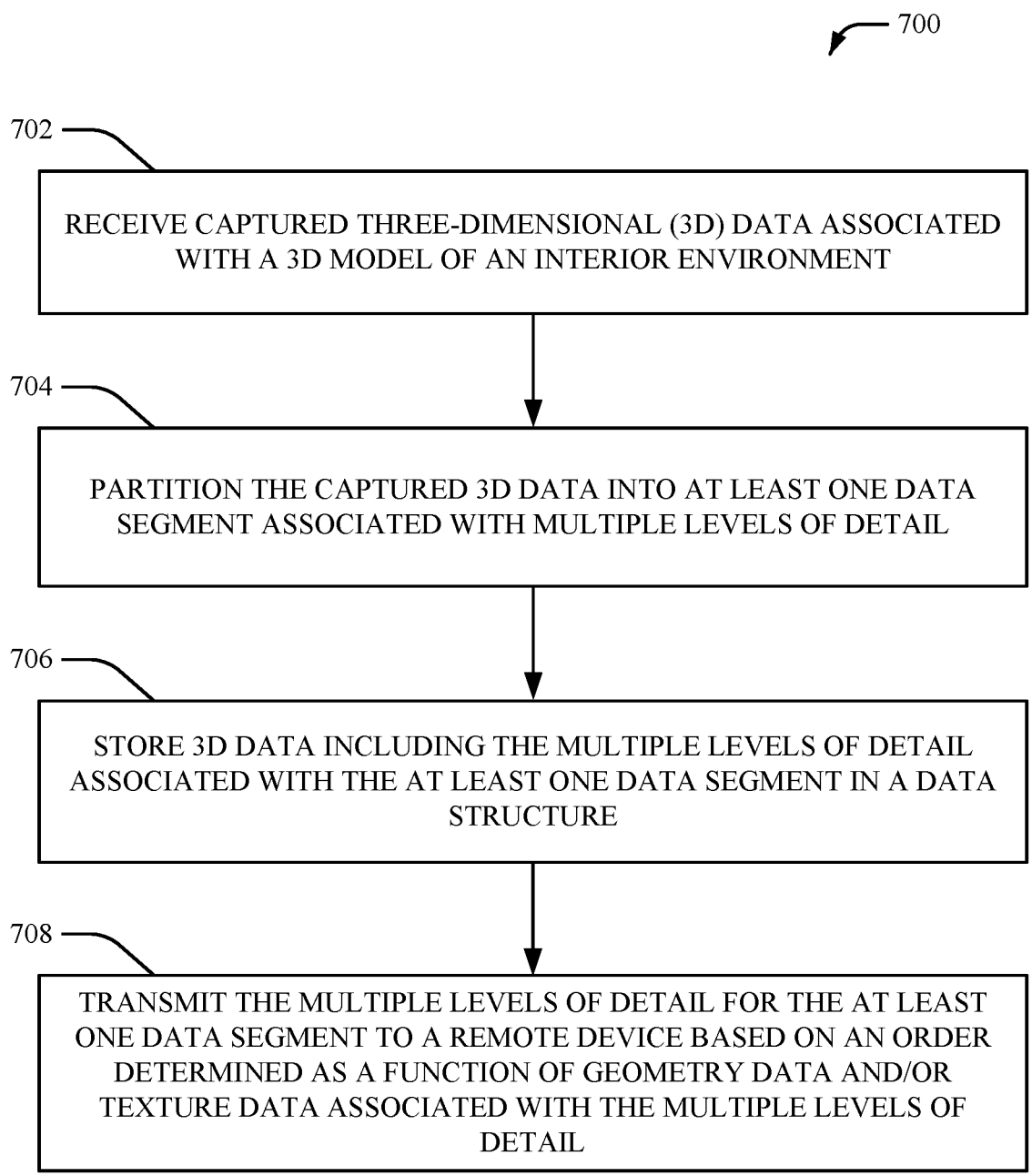
FIG. 7 depicts a flow diagram of yet another example method for processing and/or transmitting 3D data, in accordance with various aspects and implementations described herein.

Referring to FIG. 7, there illustrated is a methodology 700 for processing and/or transmitting 3D data, according to yet another aspect of the subject innovation. At 702, captured three-dimensional (3D) data associated with a 3D model of an interior environment is received (e.g., by a processing component 102 and/or a partitioning component 104). At 704, the captured 3D data is partitioned into at least one data segment associated with multiple levels of detail (e.g., using a partitioning component 104). At 706, 3D data including the multiple levels of detail associated with the at least one data segment is stored in a data structure (e.g., by a data component 105). At 708, the multiple levels of detail for the at least one data segment are transmitted to a remote device (e.g., by an output component 108) based on an order determined as a function of geometry data and/or texture data associated with the multiple levels of detail.

Figure 8:
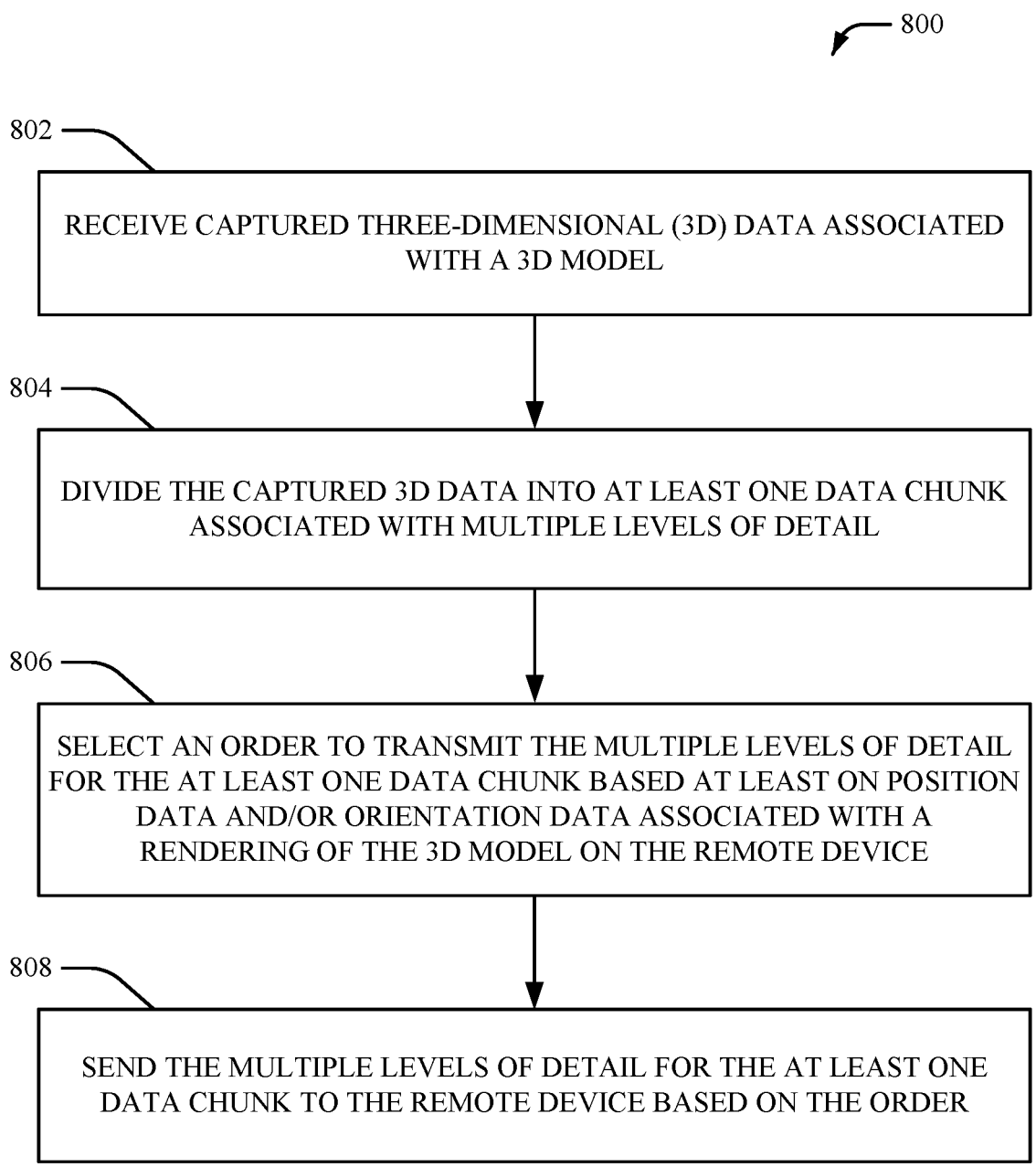
FIG. 8 depicts a flow diagram of yet another example method for processing and/or transmitting 3D data, in accordance with various aspects and implementations described herein.

Referring to FIG. 8, there illustrated is a methodology 800 for processing and/or transmitting 3D data, according to yet another aspect of the subject innovation. At 802, captured three-dimensional (3D) data associated with a 3D model is received (e.g., by a processing component 102 and/or a partitioning component 104). At 804, the captured 3D data is divided into at least one data chunk associated with multiple levels of detail (e.g., using a partitioning component 104). At 806, an order to transmit the multiple levels of detail for the at least one data chunk is selected (e.g., using a selection component 106) based at least on position data and/or orientation data associated with a rendering of the 3D model on the remote device. At 808, the multiple levels of detail for the at least one data chunk are sent to the remote device (e.g., by an output component 108) based on the order.

Figure 9:
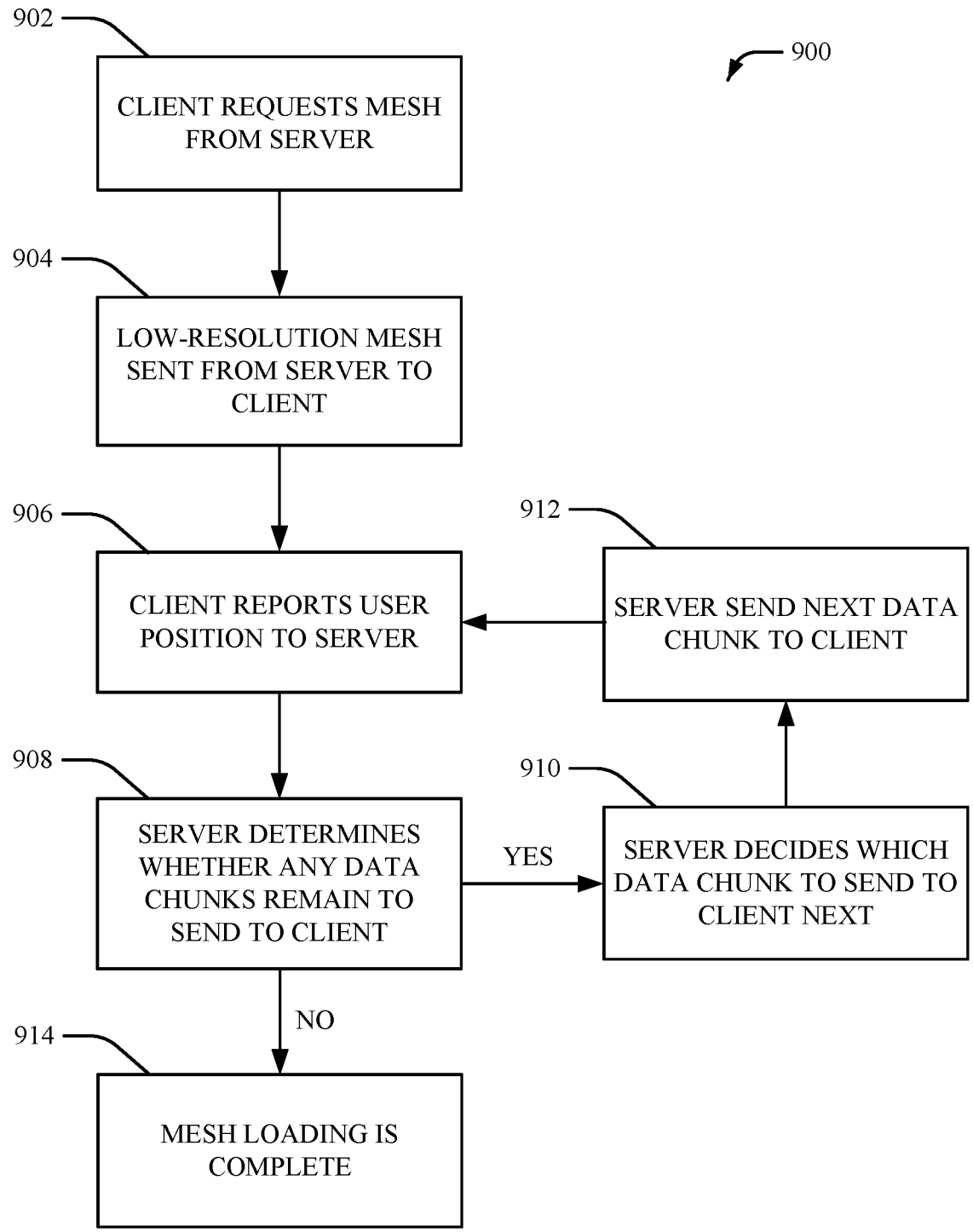
FIG. 9 depicts a flow diagram of an example method for sending data chunks from a server to a remote client device based on view position, in accordance with various aspects and implementations described herein.

Referring to FIG. 9, there illustrated is an example methodology 900 for sending data chunks from a server to a remote client device based on view position, according to an aspect of the subject innovation. For example, methodology 900 shows an example communication flow between a remote client device and a server for selecting a particular level of detail and/or a particular data chunk based on feedback from the remote client device (e.g., a position of a camera associated with the remote client device). At 902, a client requests a mesh from a server. For example, a remote client device can request 3D data from a server. In an aspect, the remote client device can send an initial position of a user in a rendering of a 3D model (e.g., a viewing position associated with a web-based viewer implemented on the remote client device). As such, an initial mesh sent from the server to the client can be chosen to more accurately correspond to an initial viewpoint associated with the client. At 904, a low-resolution mesh is sent from the server to the client. For example, the server can send initial data regarding the mesh (e.g., a data chunk or a collection of data chunks representing a low resolution version of the mesh and/or textures associated with the 3D data) to the remote client device (e.g., to be initially displayed on the remote client device). At 906, the client reports a user position to the server. For example, the remote client device can report a position of a user in a rendering of a 3D model (e.g., a viewing position associated with a viewer implemented on the remote client device, a camera position associated with a 3D model viewer implemented on the remote client device, etc.). In one example, the user position can be represented by three floating point numbers for the X, Y, and Z coordinates of the user position in 3D space. In another example, data (e.g., a quaternion) representing orientation (e.g., a viewing direction) of a virtual camera or a view frustum associated with a position of a user in a 3D model rendered on the remote client device is reported to the server in addition to the user position. For example, a quaternion can comprise standard representations as four floating point numbers satisfying a particular relation, and can be reduced to three independent floating point numbers. In an aspect, the client reports an updated user position to the server. For example, the remote client device can report an updated position of a user in a rendering of a 3D model (e.g., an updated viewing position associated with a viewer implemented on the remote client device). In one example, the updated user position can correspond to the initial user position. In another example, the updated user position can be different than the initial user position.

At 908, the server determines whether any data chunks remain to send to the client. For example, the server can determine whether there are any remaining data chunks at any level of detail which can be sent to the remote client device. If no, methodology 900 proceeds to 914. At 914, mesh loading is complete. If yes, methodology 900 proceeds to 910. At 910, the server decides which data chunk to send to the client next. For example, if there are remaining data chunks then the server can determine which data chunk and/or which level of detail to send to the client next. In one example, the server can determine which data chunk and/or which level of detail to send to the client next based on position data and/or orientation data determined at 906. At 912, the server sends a next data chunk to the client. Next, at 906, the client reports a new user position to the server. In one example, the new user position can be the same as the previously reported user position. In another example, the new user position can be different than the previously reported user position. As such, methodology 900 can continue until the client no longer requires the mesh or until the server has determined that the mesh loading is complete (e.g., at 914). In an alternate embodiment, 908 and/or 910 can be implemented on the client. In an aspect, the server can transmit information associated with each data chunk and/or information associated with each level of detail for a data chunk to the client to facilitate determining whether any data chunks remain to send to the client and/or deciding which data chunk to send to the client next.

Figure 10:
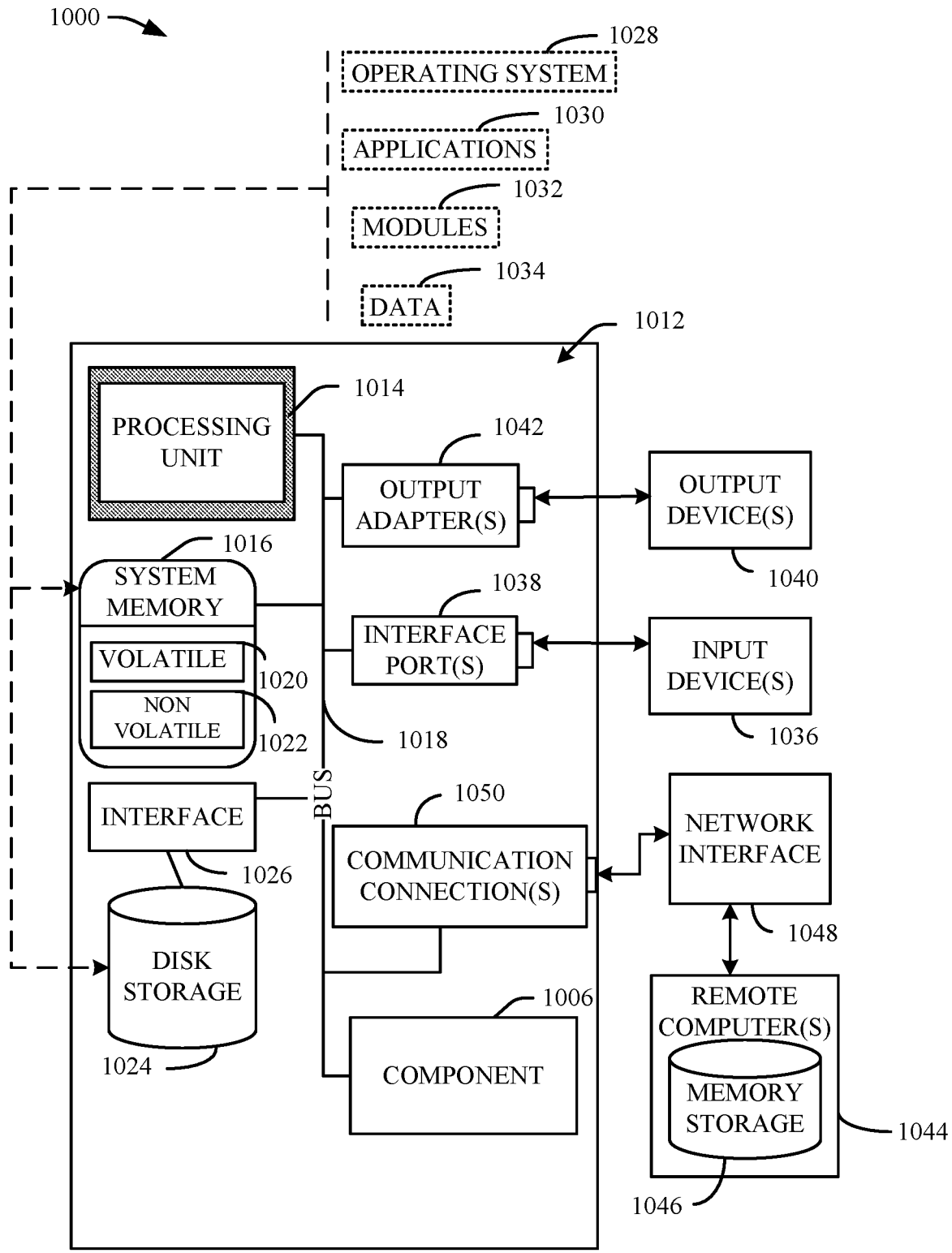
FIG. 10 is a schematic block diagram illustrating a suitable operating environment.
Figure 11:
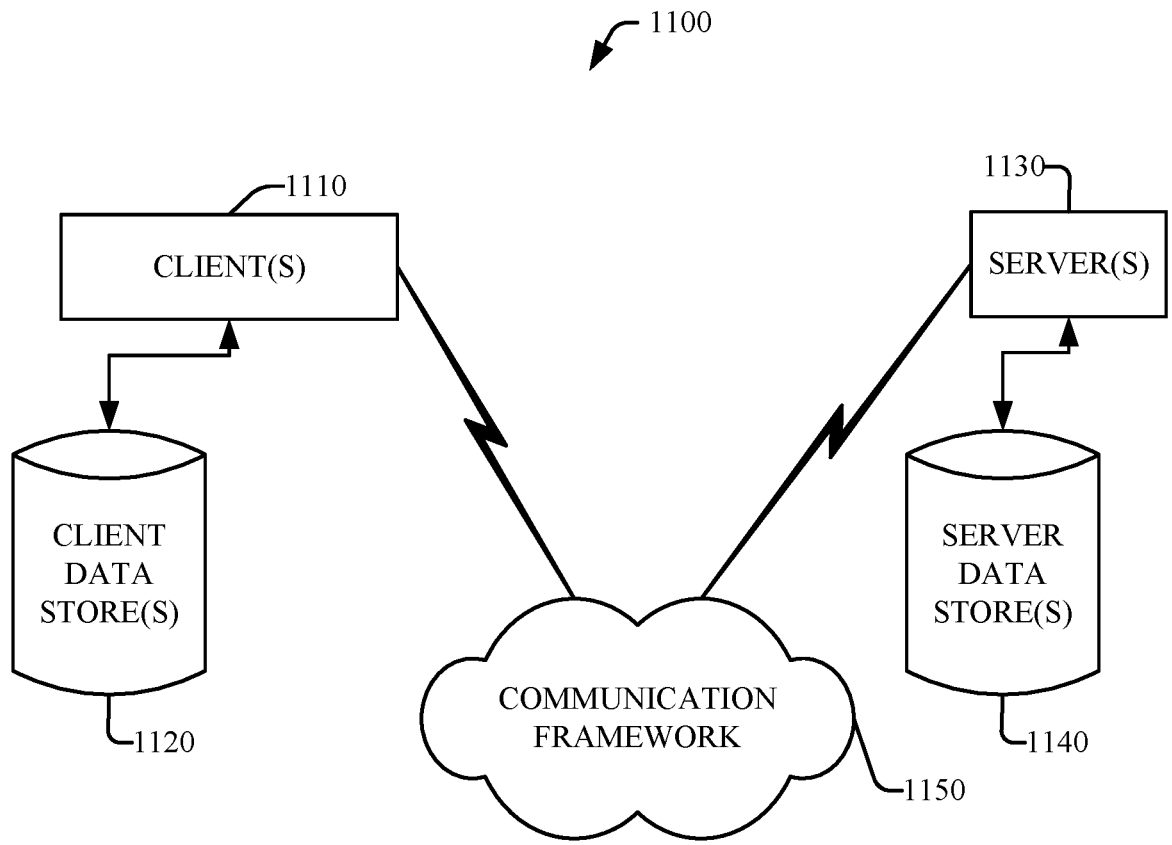
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

With reference to FIG. 10, a suitable environment 1000 for implementing various aspects of this disclosure includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

It is to be appreciated that the computer 1012 can be used in connection with implementing one or more of the systems, components and/or methodologies shown and described in connection with FIGS. 1-9. In accordance with various aspects and implementations, the computer 1012 can be used to facilitate processing and/or transmitting 3D data. In certain exemplary embodiments, the computer 1012 includes a component 1006 (e.g., the processing component 102) that can contain, for example, a partitioning component, a data component, a selection component and/or an output component, each of which can respectively function as more fully disclosed herein.

FIG. 11 is a schematic block diagram of a sample-computing environment 1100 with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), Blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., processing component, partitioning component, data component, selection component, output component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The invention claimed is:

1. A system, comprising:
a memory storing computer executable components; and
a processor configured to execute following computer executable components stored in the memory:
a partitioning component that receives a captured first three-dimensional (3D) data and second 3D data, the first 3D data being used within a 3D model of an interior environment during a first period of time and the captured second 3D data at a time after the first period of time, the partitioning component partitioning the captured first 3D data into at least a first region and a second region based on first planes identified in the 3D model of the interior environment, the partitioning component partitioning the captured second 3D data into at least at least a third region and a fourth region based on second planes identified in the 3D model interior environment; and
an output component that transmits, to a digital device over a network, one of the first region and the second region of the first 3D data, and subsequently transmits, to the digital device, an update to one of the first region and the second region using one of the third region and the fourth region based on position data and orientation data associated with a camera view within a rendering of the 3D model.

2. The system of claim 1, further comprising a selection component that selects one of the first region and the second region stored in a data component, the selection of one of the first region and the second region being based on a transmission order, the transmission order being based on the position data and the orientation data associated with the camera view within the rendering of the 3D model.

3. The system of claim 2, wherein the selection component is implemented on the digital device.

4. The system of claim 2, wherein the selection component selects the third region or the fourth region for transmission, to the digital device, based a position of a viewpoint associated with the camera view within the rendering of the 3D model.

5. The system of claim 2, wherein the selection component selects the third region or the fourth region for transmission, to the digital device, based on a view frustum associated with the camera view within the rendering of the 3D model.

6. The system of claim 2, wherein the selection component selects the third region or the fourth region for transmission, to the digital device, based on a history of position data associated with the rendering of the 3D model on the digital device.

7. The system of claim 2, wherein the selection component selects the third region or the fourth region for transmission, to the digital device, based on a visibility-based culling technique.

8. The system of claim 1, wherein the output component transmits, to the digital device, first texture data for the at least one of the first region or the second region of the first 3D data.

9. The system of claim 1, wherein the output component transmits, to the digital device, first mesh data for the at least one of the first region and the second region at a first resolution and subsequently transmits, to the digital device, second mesh data for an other of the first region and the second region at a second resolution in response to a determination that a viewpoint associated with the rendering of the first 3D data on the digital device satisfies a defined criterion.

10. The system of claim 1, wherein the output component transmits the update after the output component transmits the first region and the second region to the digital device and after the system receives the position data and the orientation data from the digital device.

11. A method comprising:
employing a processor that facilitates execution of computer executable instructions stored on a non-transitory computer readable medium to implement operations, comprising:
partitioning a captured first three-dimensional (3D) data to be used within a 3D model of an interior environment during a first period of time and partitioning a second 3D data at a time after the first period of time, partitioning the captured first 3D data comprising partitioning the first 3D data into at least a first region and a second region based on first planes identified in a 3D model of an interior environment, partitioning the second 3D data comprising partitioning the second 3D data into at least a third region and a fourth region based on second planes identified in the interior environment;

storing the first region, second region, third region, and fourth region;

transmitting, to a digital device, the one of the first region and the second region; and transmitting, to the digital device, an update to one of the first region and the second region of the first 3D data with one of the third region and the fourth region of the second 3D data based on position data and orientation data associated with a camera view within a rendering of the 3D model.

12. The method of claim 11, further comprising:

selecting one of the first region and the second region, the selection of one of the first region or the second region of the first 3D data based on a transmission order, the transmission order being based on the position data and the orientation data associated with the camera view within the rendering of the 3D model.

13. The method of claim 11, further comprising selecting the third region or the fourth region for transmission, to the digital device, based on a position of a viewpoint associated with the camera view within the rendering of the second 3D data.

14. The method of claim 11, wherein the transmitting, to the digital device, the update to one of the first region and the second region of the first 3D data is based on a view frustum associated with the camera view within the rendering of the 3D model.

15. The method of claim 11, wherein the transmitting, to the digital device, the update to one of the first region and the second region of the first 3D data is based on a history of position data associated with the rendering of the 3D model on the digital device.

16. The method of claim 11, wherein the transmitting, to the digital device, the update to one of the first region and the second region of the first 3D data is based on a visibility-based culling technique.

17. The method of claim 11, further comprising receiving the position data and the orientation data from the digital device, wherein transmitting the update occurs after transmitting one of the first region and the second region to the digital device and after receiving the position data and the orientation data from the digital device.

18. A hardware server, comprising:

a memory storing computer executable components; and a processor configured to execute the computer executable components to:

partition a captured first three-dimensional (3D) data to be used with a 3D model of an interior environment into at least a first region and a second region, based on first planes identified in the interior environment, during a first period of time and partition a second 3D data into at least a third region and fourth region, based on second planes identified in the interior environment, at a time after the first period of time;

store the first region, second region, third region, and fourth region;

transmit, to a digital device, the one of the first region and the second region to be used in the first 3D data; and transmit, to the digital device, an update to one of the first region and the second region of the first 3D data with one of the third region and the fourth region based on position data and orientation data associated with a camera view within a rendering of the 3D model.

19. The hardware server of claim 18, wherein the processor is configured to transmit the third region or fourth region to the digital device based on a position of a viewpoint associated with the rendering of the 3D model on the digital device.

20. The hardware server of claim 19, wherein the processor is further configured to execute the computer executable components to:

transmit, to the digital device, geometry data for the at least one of the first region and the second region.

21. The hardware server of claim 18, wherein the processor is further configured to execute the computer executable components to:

transmit, to the digital device, texture data for the at least one of the first region and the second region.

* * * * *